US007984225B2

(12) United States Patent
McClure et al.

(10) Patent No.: US 7,984,225 B2
(45) Date of Patent: *Jul. 19, 2011

(54) ASCII GATEWAY TO IN-VEHICLE NETWORKS

(75) Inventors: Robert E. McClure, Danville, IN (US); David M. Such, Greenwood, IN (US); Michael T. Jewell, Lawrence, IN (US)

(73) Assignee: Dearborn Group, Inc., Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/653,637

(22) Filed: Dec. 16, 2009

(65) Prior Publication Data

US 2010/0174445 A1 Jul. 8, 2010

Related U.S. Application Data

(63) Continuation of application No. 10/227,757, filed on Aug. 26, 2002, now Pat. No. 7,660,934.

(60) Provisional application No. 60/315,385, filed on Aug. 28, 2001.

(51) Int. Cl.
G06F 13/36 (2006.01)
G06F 15/16 (2006.01)
G06F 19/00 (2011.01)

(52) U.S. Cl. ........ 710/311; 710/306; 710/315; 709/250; 701/29; 701/33

(58) Field of Classification Search .................... 710/15, 710/62, 65, 72, 100, 305–306, 311, 315; 709/250; 701/24, 29, 36
See application file for complete search history.

(56) References Cited

U.S. PATENT DOCUMENTS

| 5,142,469 A | 8/1992 | Weisenborn |
| 5,541,840 A | 7/1996 | Gurne et al. |
| 5,854,454 A | 12/1998 | Upender et al. |
| 5,966,069 A | 10/1999 | Zmurk et al. |
| 6,148,656 A | 11/2000 | Breton |
| 6,295,492 B1 | 9/2001 | Lang et al. |
| 6,526,340 B1 | 2/2003 | Reul et al. |
| 6,584,865 B1 | 7/2003 | Doherty et al. |
| 7,660,934 B2 | 2/2010 | McClure et al. |
| 2001/0025323 A1 | 9/2001 | Sodergren |
| 2002/0004702 A1 | 1/2002 | Ruhl |

(Continued)

OTHER PUBLICATIONS

"SAE J1939" Kvaser Can Pages. Online Nov. 15, 1998. Retrieved from Internet Oct. 26, 2004. http://web.archive.org/web/19981203114018;http://www.kvaser.com/can/hlps/j1939.htm.

(Continued)

Primary Examiner — Thomas J Cleary
(74) Attorney, Agent, or Firm — Warn Partners, P.C.

(57) ABSTRACT

ASCII gateway to in-vehicle system provides bi-directional translation between multiplexed motor vehicle networks and industrial control and monitoring devices. Integrated hardware and software components provide data communications between motor vehicle electronic control module networks and RS-232 serial ASCII-text capable device, for industrial control and/or industrial automation application in manufacturing or assembly operations. Communications networks (CAN, SAE or ISO protocols) implemented inside motor vehicles pass data between electronic control modules that control operation of important vehicle components like engine, transmission and brake systems, have their messages converted to RS-232 serial ASCII-text; and from RS-232 serial ASCII-text converted to motor vehicle communications network by the system. Messages to monitor and/or control vehicle networks are generated by a serial ASCII-test capable device. Multiple vehicle protocols are supported by the system. The system translates between RS-232 serial ASCII-text message generated or received by a device and the vehicle network.

26 Claims, 30 Drawing Sheets

U.S. PATENT DOCUMENTS

2002/0133273 A1    9/2002    Lowrey et al.
2003/0052801 A1    3/2003    McClure et al.

OTHER PUBLICATIONS

"AutoTap-OBDII Diagnostic Scanner." B&B Electronics. Online Feb. 9, 2000. Retrieved from Internet Oct. 26, 2004. http://web.archive.org/web/20000226025552/http://www.autotap.com.

"AutoTap scan tool Frequently Asked Questions." B&B Electronics. Online Apr. 5, 2001. Retrieved from Internet Apr. 21, 2005. http://web.archive.org/web/20010405104503/http://autotap.com/faq.html.

"Does My Car Have OBDH?-OBDII Connector". B&B Electronics. Online Mar. 3, 2001. Retrieved from Internet Apr. 21, 2005. http://web.archive.org/web/20010331093205/http://autotap.com/doesmycarhaveobdii.html.

"App Note 083: Fundamentals of RS-232 Serial Communications". Application Note. Dallas Semiconductor. Maxim Integrated Products. Online Mar. 29, 2001. Retrieved from Internet Apr. 21, 2005. http://www.maxim-ic.com/appnotes.cfm/appnote_number/527.

Oliver, D. John "Implementing the J1850 Protocol". White Paper. Intel Corporation 1999.

"Fast EtherLink XL and EtherLink XL PCI Network Interface Cards". 3Com Corporation. 1996.

"2-Port Multiprotocol PCI Adapter Installation and User's Guide". IBM Corporation. Apr. 1997.

"AVT-716—Triple Interface (J1850 VPW, PWM and ISO 9141)". Data sheet 059. Advanced Vehicle Technologies, Inc. Jun. 1997. Retrieved from Internet Apr. 21, 2005. http://www.avt-hq.com/716br.htm.

"prj.perquin.com-OBD-II serial interface for PC and microcontroller and ISO 14230-2 protocol description" prj.perquin.com Hardware/Software Projects. Online Oct. 27, 2004. Retrieved from Internet May 12, 2006. http://prj.perquin.com/obdii.

"RS-232" in Wikipedia, the free encyclopedia. Online Apr. 17, 2006. Retrieved from Internet Apr. 21, 2006. http://en.wikipedia.org/wiki/RS232.

"OBD-II PIDs" in Wikipedia, the free encyclopedia. Online Apr. 18, 2006. Retrieved from Internet Apr. 20, 2006. http://en.wikipedia.org/wiki/OBD-II_PIDs.

"Dearborn Group Expands Protocol Adapter Series". Diesel Progress North American Edition. Diesel and Gas Turbine Publications. Feb. 2000. Retrieved from Internet Nov. 17, 2006. http://www.findarticles.com/p/articles/mi_m0FZX/is_2_66ai_60571726/print.

"DPA Products" Dearborn Group Technology Webpage. Retrieved from Internet Nov. 17, 2006. http://wvvw.dgtech.com/product/dpa/dpa.php.

"DPA/I". Dearborn Group Technology. Oct. 2002.

"J1850 Testing and Verification Tool". JNAT-E User's Manual. Version 2.0. Dearborn Group Technology. Copyright 1996, 1999, 2001, pp. 5-7 and 52-53.

"J1850 Network Analysis Tool JNAT User's Manual." Version 6.1. Copyright 1999. Dearborn Group, Inc. Document #042999-J.

"J1850 Network Analysis Tool JNAT User's Manual". Version 5.0. Copyright 1996, 1999. Dearborn Group, Inc., Document #021599-D.

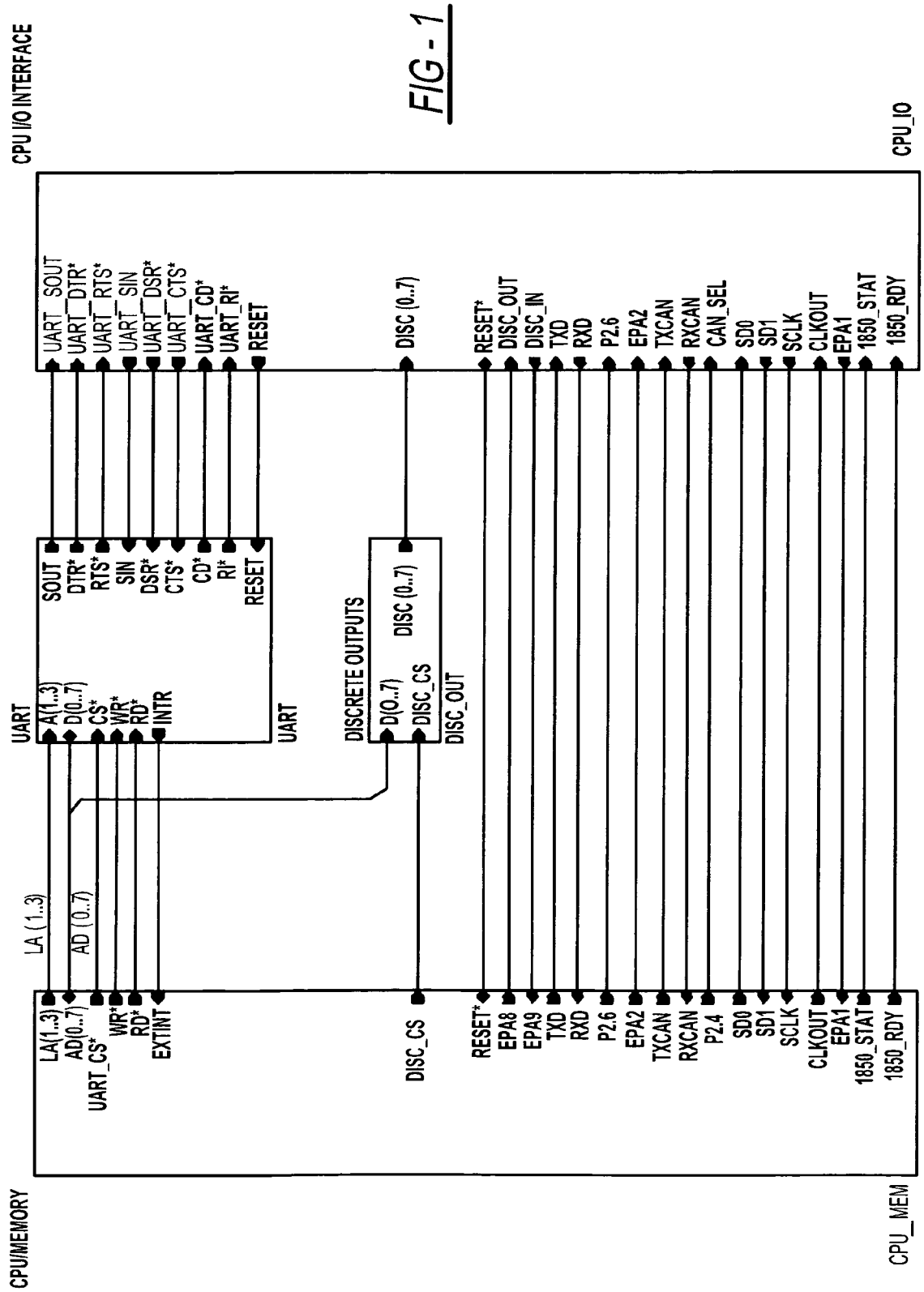

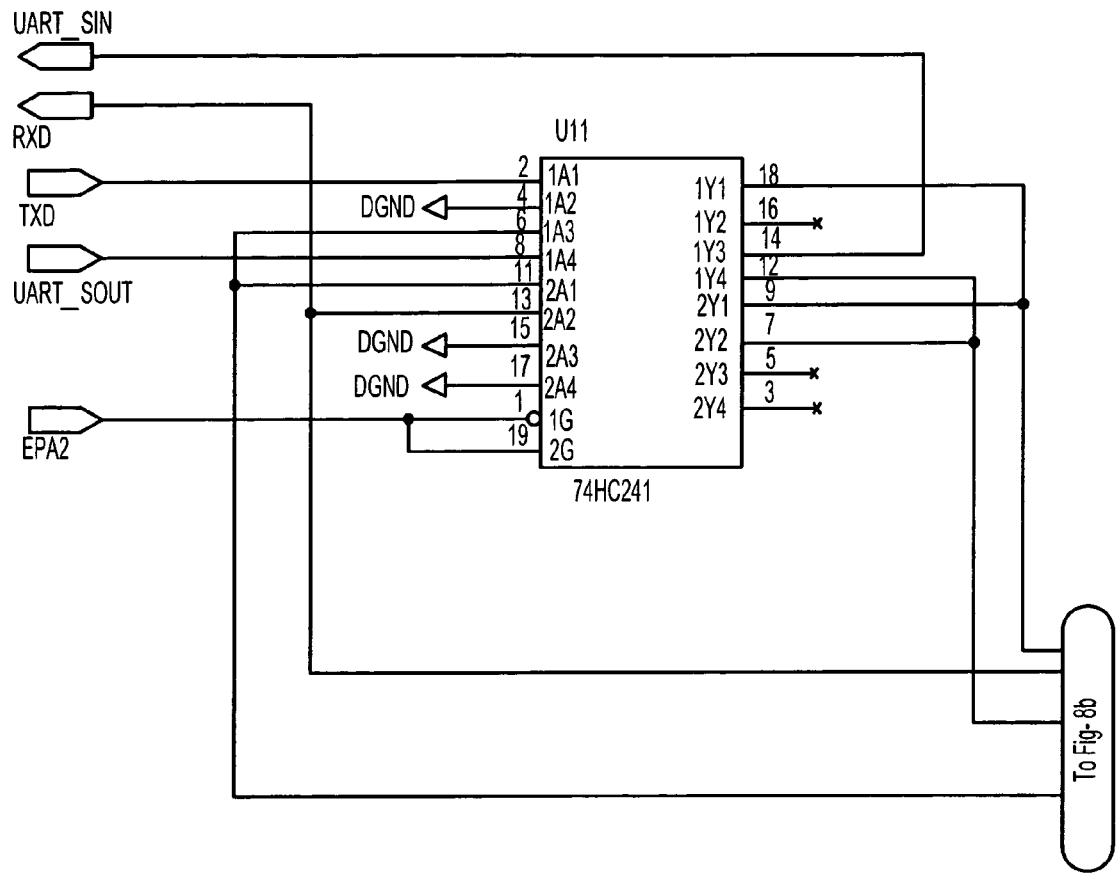
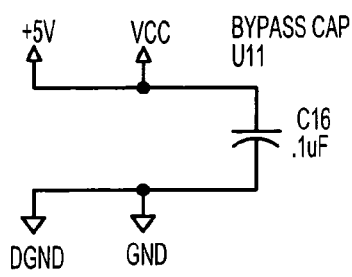
FIG - 8a

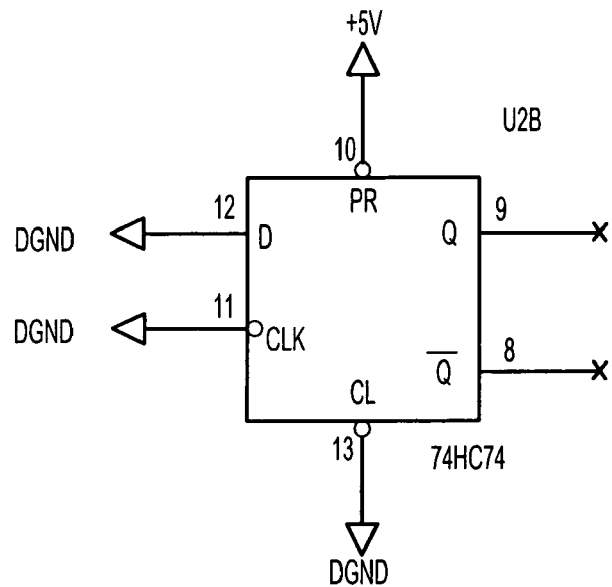
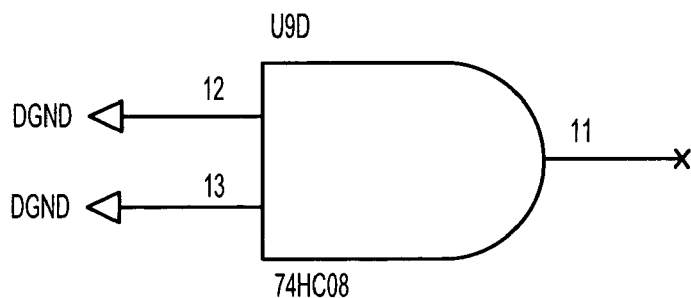
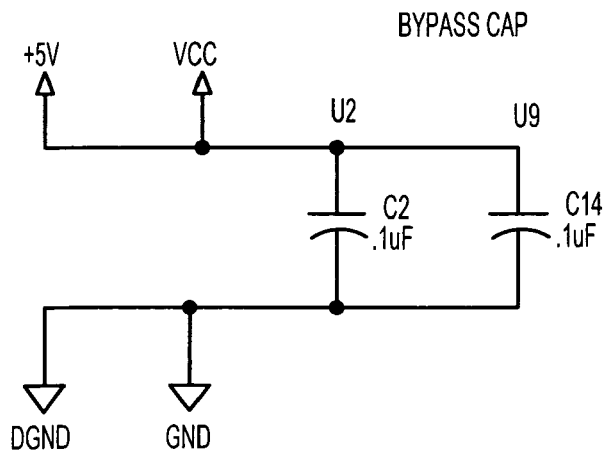
FIG - 10

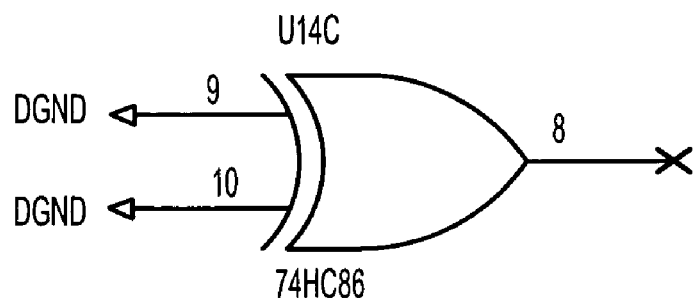
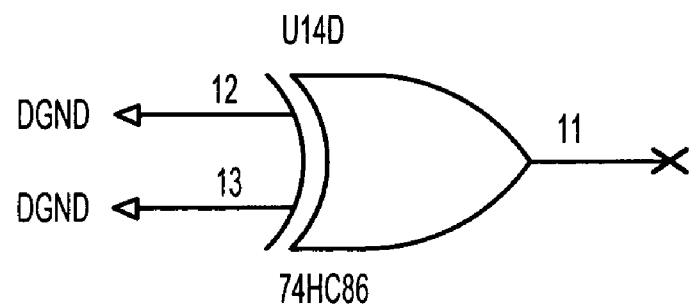
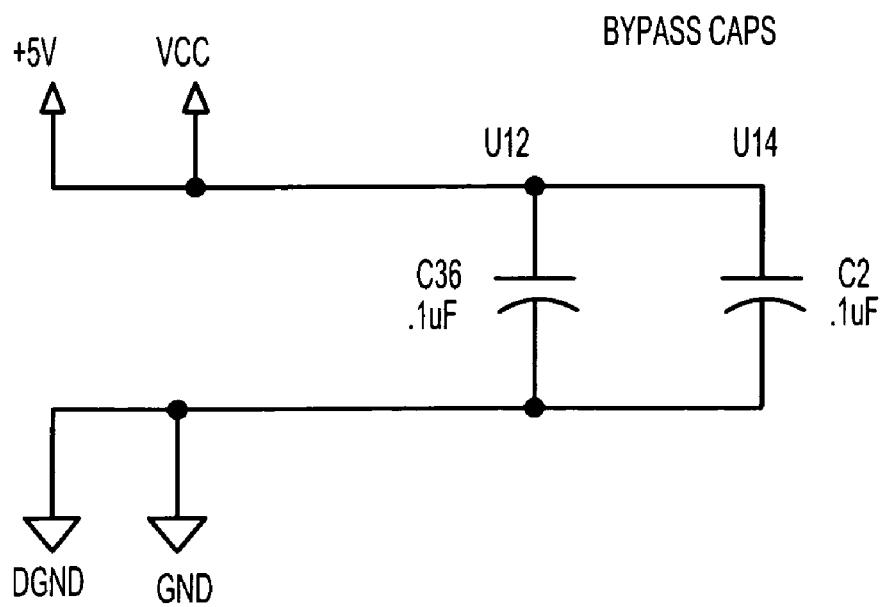
FIG - 20

DPA III PLUS - LED DESCRIPTIONS

LED No.1 (red) - Black text, Power, indicates power on when illuminated.

FIG - 21

LED No.2 - Black text, Mode, plus red and green text as shown below:

| Red text | Corresponding meaning for LED when illuminated (red) |
|---|---|
| DPA | Normal operation of the DPA unit. Flashes red only when serial communications with PC is occurring. |

| Green text | Corresponding meaning for LED when illuminated (green) |
|---|---|
| PASS | Normal DPA operation is suspended, and the protocol pass-through functionality is activated. Indicated by steady flashing green. |

| Note: | Alternating red/green indicates reflash (reprogramming) in progress. |
|---|---|

FIG - 22

LED No.3 - Red and green text as shown below:

| Red text | Corresponding meaning for LED when illuminated (red) |
|---|---|
| J1939 | Dual-wire CAN is in operation: (J1939, Standard CAN or J2284 High-speed CAN) Flashes red when valid bus traffic is present. |

| Green text | Corresponding meaning for LED when illuminated (green) |
|---|---|
| SW CAN | Single-wire CAN is in operation: J2411 (if implemented). Flashes green for bus traffic. |

FIG - 23

DPA III PLUS - LED DESCRIPTIONS

LED No.4 - Red and green text as shown below:

| Red text | Corresponding meaning for LED when illuminated (red) |
|---|---|
| J1850 | Chrysler J1850 protocol is in operation (if implemented). Flashes red for bus traffic. |

| Green text | Corresponding meaning for LED when illuminated (green) |
|---|---|
| Class II | GM Class II J1850 protocol is in operation. Flashes green for bus traffic. |

*FIG - 24*

LED No.5 - Red and green text as shown below:

| Red text | Corresponding meaning for LED when illuminated (red) |
|---|---|
| J1708 | J1708 protocol is in operation. Flashes red for bus traffic. |

| Green text | Corresponding meaning for LED when illuminated (green) |
|---|---|
| UART | One of several UART protocols is in operation: GM Class I (ALDL), ISO 9141-2, ISO 9141-1989, ISO-9141-Special (for Case). Flashes green for bus traffic. |

*FIG - 25*

Note: See the diagram on the following page for LED locations on the DPA III unit.

DPA III PLUS - LED LAYOUT DIAGRAM

```
Dearborn Group DPA III
                                            3 ⊕  (D6)

Mode    Power
 2 ⊕     1 ⊕                                4 ⊕  (D5)
(D8)    (D1)

5 ⊕  (D7)
```

Note: Characters within parenthesis refer to schematic designations (Fig-17)

*FIG - 26*

ASCII GATEWAY TO IN-VEHICLE NETWORKS

REFERENCE TO RELATED APPLICATION

This is a Continuation Application of U.S. patent application Ser. No. 10/227,757, entitled "ASCII GATEWAY TO IN-VEHICLE NETWORKS", filed on Aug. 26, 2002, which application is based on provisional patent application Ser. No. 60/315,385, filed Aug. 28, 2001.

BACKGROUND OF THE INVENTION

The field of the invention pertains to in-vehicle networks for diagnostics, analysis and monitoring. The networks integrate with PC gateways for data acquisition, computer-based measurement, and automation systems with in-vehicle communication. However, in the past, when hardware components were upgraded, existing software could become non-compatible with the upgraded hardware. Manufacturers of various tools attempted to remedy these compatibility problems by using a box to talk to multiple data links. This was not very satisfactory and a better solution to this problem was needed.

There is a marked need for engineers, designers and maintenance personnel to have access to the status, and often times control of automotive vehicle parameters of vital system components like engines, transmissions, brakes and instrument clusters.

SUMMARY OF THE INVENTION

The present invention relates to a gateway communication system that functions by translating data specified by a serial ASCII-text generating device into communications protocols compatible with those used by electronic control modules found in automotive vehicles. The automotive vehicles may be cars, trucks buses, marine craft, locomotives of otherwise.

Operating in a client/server mode, the data translation is always initiated by a client device that transmits serial ASCII-text to the system. Based upon the message contained in the transmitted data, the system then serves to generate a message in the appropriate communications protocol that will be compatible with the electronic control module in use for a given application. Some messages generated are outgoing only, while others request data to be returned in serial ASCII-text form. In cases of requests for returned data, the electronic control module will transmit data in its inherent communications protocol that will in turn be converted to serial ASCII-text by this system.

This invention provides access to vital automotive parameters through a commonly found hardware and software interface: serial port generated ASCII-text, which is a standard feature of microcomputers and programmable logic controllers alike.

Acting as a gateway, or translator box, between the network of electronic control modules (ECMs) found on automotive vehicles and serial ASCII-text generating device(s), available vehicle parameters may be accessed in factory floor, maintenance shop and design engineering environments, among other locations.

The invention is an improvement in ease of use and cost, and is compatible to most smart devices like programmable logic controllers, microcomputers and embedded microprocessors systems. This invention's use of serial ASCII-text is an improvement over past systems that provided this functionality because it replaces the need for comparatively expensive and complex application software formerly required to perform the network data translations.

The invention is for in-vehicle use. The protocol adapter of the invention is a diagnostic tool that can bridge a lap-top or bench-top or other computer to a vehicle network. The improved protocol adapter has additional capabilities beyond earlier versions. It is advantageous for research and development applications, end of line testing and design and production applications such as quality control, life-cycle testing and burn-in applications. The protocol adapter of the invention solves the above-identified problem by operating as a translator box that works with a variety of software packages. Thus, the invention is operable with existing diagnostic software packages.

The improved protocol adapter of the invention supports the following:
- SAE J1850, GM Class 2 protocol;
- SAE J1850, Chrysler protocol (future activation supported);
- GM Class 1 UART (ALDL) protocol;
- ISO 9141-2 protocol;
- ISO 9141-1989 protocol;
- ISO 9141-Special protocol (for Case Corp.);
- SAE J2284, Dual-wire CAN protocol; and
- SAE J2411, Single Wire CAN protocol (future activation supported).

A special pass-through mode allows users to continue utilizing yesterday's in-house software, while communicating with today's hardware. Older software packages such as RP1202 and RP1210 can still be employed. This feature allows users to replace aging hardware with an interface that can support existing software. Consequently, users can replace old hardware with the invention and yet maintain compatibility with their original software.

The earlier protocol adapter supported SAE J1708, SAE J1939, and Control-Area (CAN) networks. The earlier adapter has a voltage converter mode that supports RS-232-to-RS-485 voltage conversion. The normal RS-232 port allows direct access to the J1708/RS-485 link. The improved protocol adapter supports the listed prior protocol adapter features, including a library (DLL/VxD for Windows) and on-board flash for field upgrades. The improved protocol adapter also employs a pass-through mode which supports communication with "old" software packages (e.g. RP1202 and RP1210(A).

The improved protocol adapter expands functionality and usage of the earlier protocol adapter and can be used with a half-slot ISA card or in a PC-104 card version.

The improved protocol adapter employs expanded use of LEDs to indicate status of the device, which mode of operation, and if in communication. Dual color LED's are used to indicate which program is being executed by the protocol adapter. The pass-through ability to emulate other protocol adapters is indicated by a dual color LED to indicate the pass-through is functioning to emulate other protocol adapters. Beyond the normal use of LEDs, eight visual indicators are employed by this protocol adapter. The eight visual indicators are four dual-color LEDs (red and green). Three of the dual-color LEDs serve to notify the user which one of the six, user-selectable protocols is in use at any given time. The fourth dual-color LED indicates the mode of operation for the this protocol adapter, the DPA III Plus, referred to as "DPA" for normal mode (red) or "PASS" for pass-through mode (green). While operating in the pass-through mode, the protocol adapter additionally supports communications with various "older" software packages, such as RP 1202 or RP1210, whereas in the normal mode, such additional support is not provided. Alternating red/green indicates reflash (reprogramming) is in progress.

The status of the LEDs indicate to the user the mode of operation for the device and which of the various protocols is currently active. The meaning of the LED indicator status will be described hereinbelow.

It should be noted that earlier protocol adapters support communications with "older" protocols, but earlier protocols do not provide an indication to the user as to which mode is being used (normal or pass-through).

Prior adapters used a single color LED that could only notify that there is RS232 bus activity between the device and the PC. This adapter of the invention uses an LED in the same physical location, but a dual-color LED allows indication of which mode is being used. A red LED is used to indicate when power is applied to the unit.

This adapter incorporates additional functionality of supporting the use of Dearborn Programmable Bridge (DPB) software. Compatibility with the DPB allows this adapter to support translation of messages between any of the protocols currently in use, e.g., SAE J1939 to J1708. The addition of DDPB capabilities is integrated into the functionality of the adapter is such a manner as the make the inclusion of support for these added capabilities transparent to the user.

The adapter provides rapid access to any supported network by allowing the user to easily switch between protocols. This rapid access affords the user with the ability to monitor and translate messages between different protocols at the same time.

An ISA, half-card version and a PC-104 version of the protocol adapter provide the functionality as described herein except for two functions that are not supported. The two functions not supported by the ISA half-card version and the PC-104 version of the protocol adapter are pass-through mode of operation and Dearborn Programmable Bridge (DPB) software compatibility.

The invention has reflashing that allows the protocol adapter to be updated with new firmware in the field. This is accomplished by U5, U1, U8 and U4. U5 (micro) processes a command sent to the protocol adapter by the host. It then copies the reflash instructions set (loader program) into RAM (U1) and then transfers control to that program (loader). The loader program responds to the commands from the host which allows the host computer to then clear and reprogram the Flash (U4). Once the reproming is complete control is passed back to the flash program.

The invention has status lights that allow the operator to determine what program is being executed by protocol adapter embedded micro. U5 and U10 will flash the LEDs on the I/O board in a predefined manner at power up to indicate what version of firmware is being executed.

The invention has a pass through feature (voltage translator)/smart mode that allows this version of the protocol adapter to emulate older boxes. In this mode of operation, the U5 (micro) delivers data directly from the J1708 Transceiver (U11 of I/O board) to the RS232 transceiver (U7 of I/O board) and monitors the data to provide J1708 defined timing signals on any or all of the RS232 hardware handshake lines.

The improved protocol adapter can be used wirelessly to perform the following functions; ECU fault code interrogation; communication with a remote network; vehicle maintenance status checks or trip performance data downloads; and improved asset control, logistics and inventory management, diagnostic support, and maintenance/scheduling.

An ISA version of the improved protocol adapter is a half slot card that supports CAN (J1939 and DeviceNet), SAE J1850, and GM UART protocols.

The protocol adapter has additional unique features of bank switching, file upgrade capability, LED status, multiple datalinks, embedded versions, programmable manufacture's name, software locks, async transmit and receive, programmable timer and a scratch pad.

For bank switching, memory is swapped in and out of the processor's memory map to allow multiple programs to be run. For field upgrade capability, non-volatile memory can be programmed in the field to allow new software features to be added in the field. For LED status, LEDs are flashed in a unique sequence at power-up to indicate what version of firmware is being executed. For multiple data link may be supported at the same time. Firmware and hardware version numbers are available to the host to allow the host to determine current capabilities. The manufacturer's name is embedded in FLASH to allow VARs to put in the name of their own company.

Proprietary software lock/key may be burned into flash to allow of VARs software. The device is capable of receiving and transmitting asynchronously of host processor and can broadcast on transmit and filter on receive.

The device has a programmable multi-function timer to support datalink communications. The scratch pad is a built-in remote access memory to allow the host to consolidate message data.

Features of the improved protocol adapter are support for RP1202 and RP1210, J1708 and J1939, J1939 Transport Layer. The improved protocol adapter has a Real Time Clock, Standard COMM port connection, 7-32 Volt Supply and is CE compliant.

BRIEF DESCRIPTION OF THE DRAWINGS

FIG. 1 illustrates DPA III Plus CPU Board;
FIG. 8a illustrates a first portion of CPU/I/O Interface Connectors;
FIG. 10 illustrates Unused Spare Gates.

FIG. 20 illustrates Unused Gates;

FIG. 21 illustrates LED No. 1 description;

FIG. 22 illustrates LED No. 2 description;

FIG. 23 illustrates LED No. 3 description;

FIG. 24 illustrates LED No. 4 description;

FIG. 25 illustrates LED No. 5 description; and

FIG. 26 illustrates LED layout diagram.

DESCRIPTION OF THE PREFERRED EMBODIMENTS

The invention is applicable for monitoring or controlling functions on automotive vehicles. Through the use of this system, whether for a car, truck or bus, marine craft, or locomotive the operating, performance and diagnostic parameters of the vehicle may be accessed. The parameters that may be accessed for monitoring or control are those made available through the electronic control modules found in the these vehicle equipped to control their vital system components like engines, transmissions, brakes and instrument clusters.

Figure 2A:
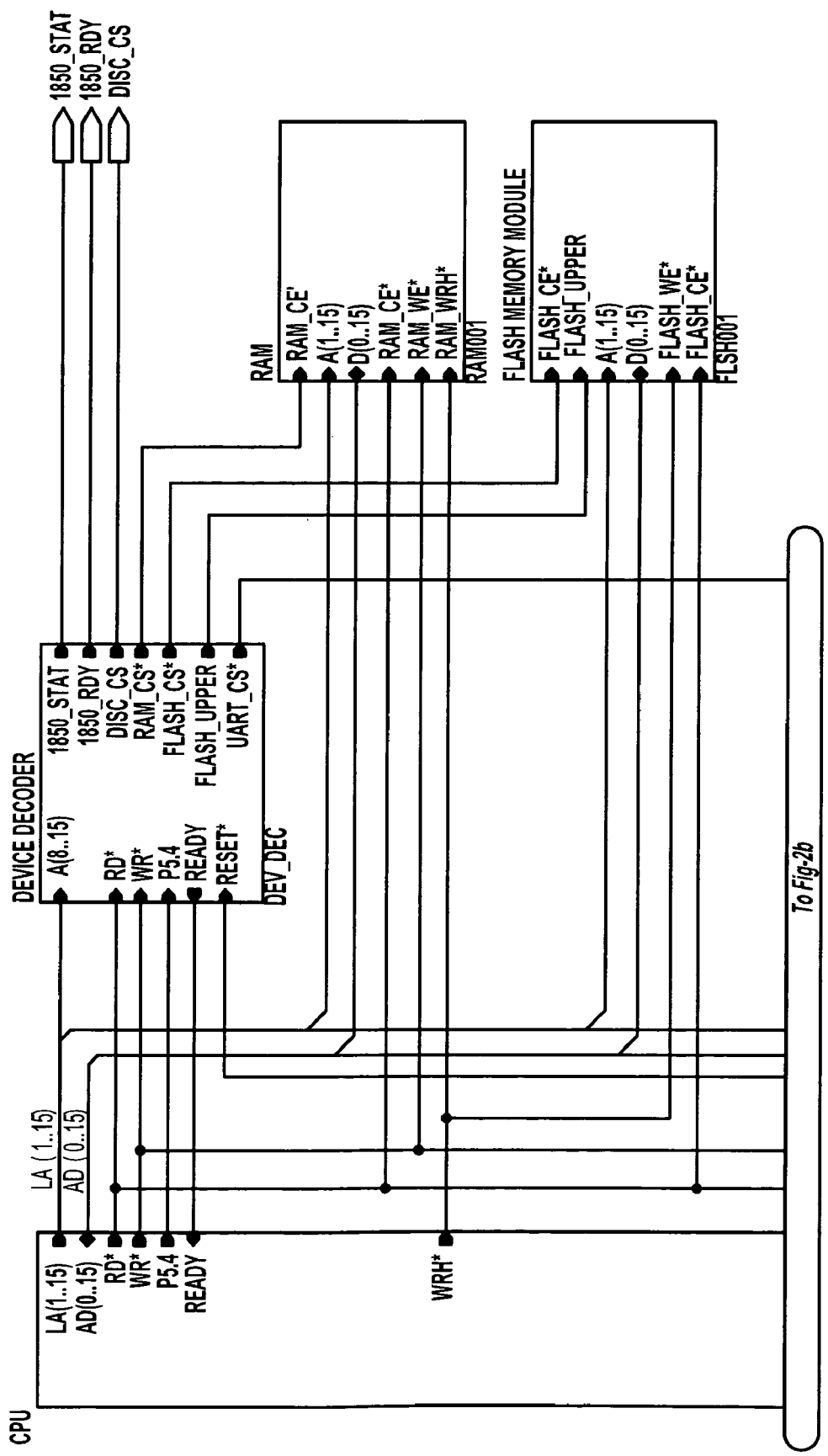
FIG. 2a illustrates a first portion of a CPU Memory Module.
Figure 2B:
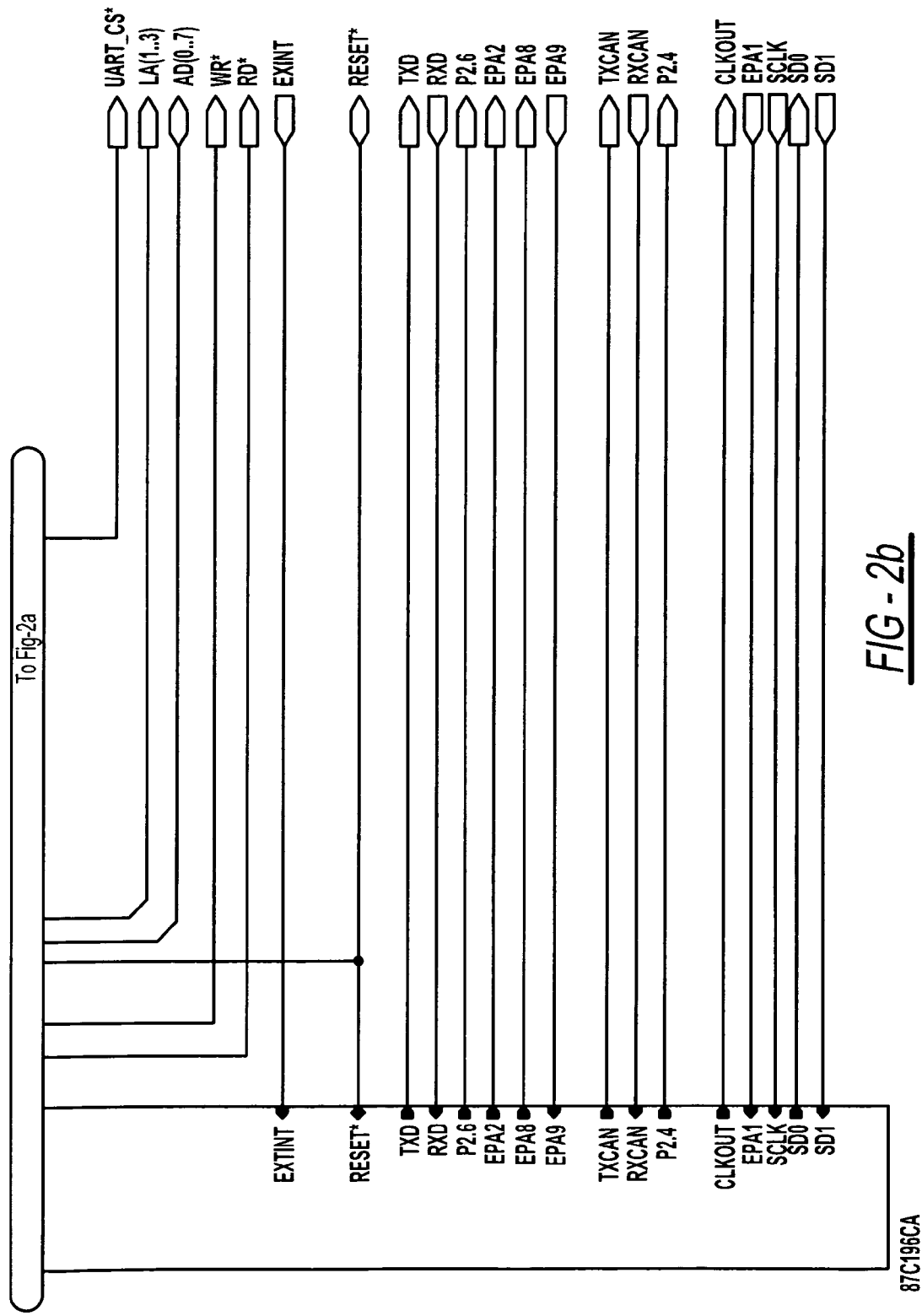
FIG. 2b illustrates a second portion of a CPU Memory Module.
Figure 3A:
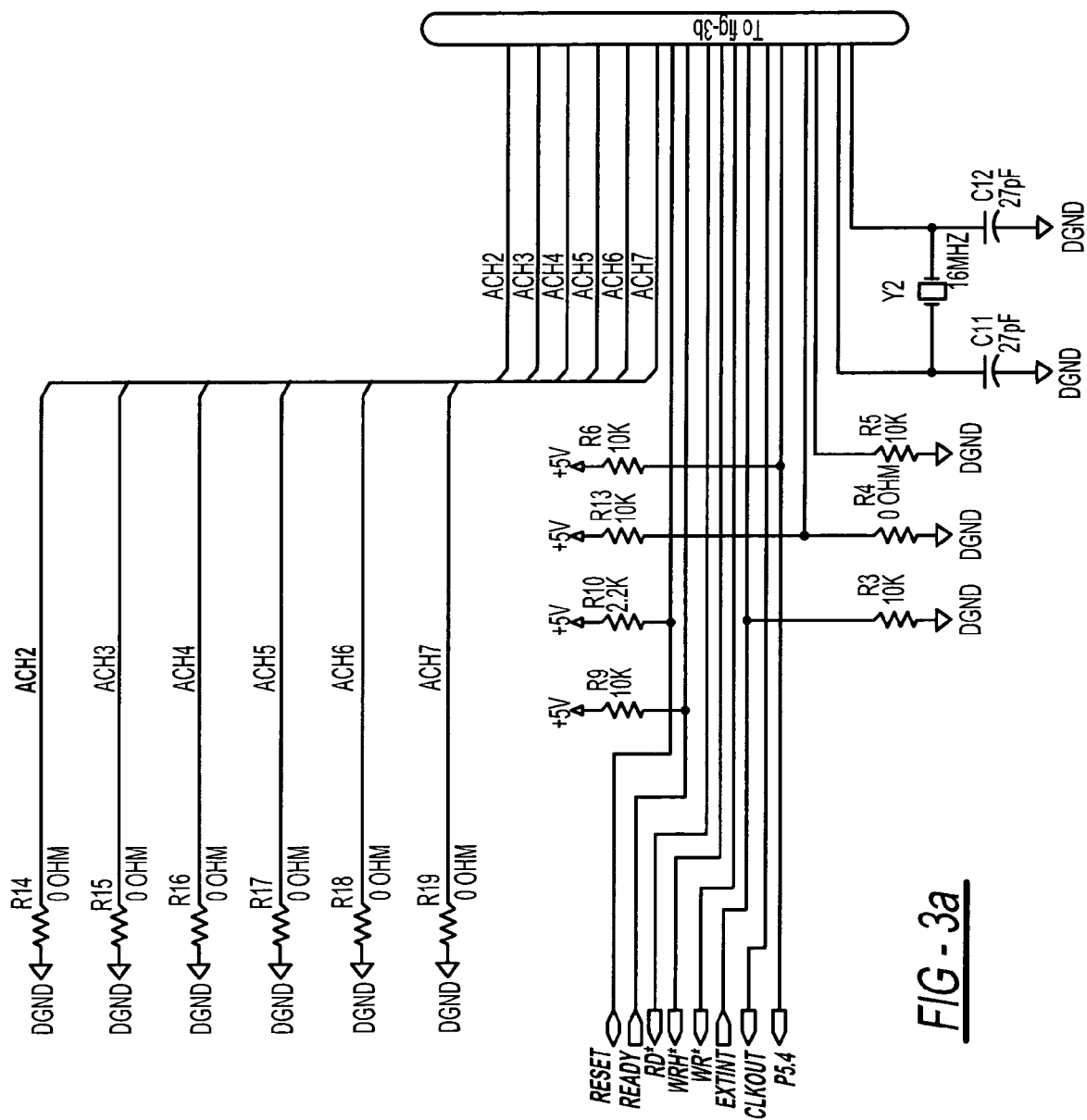
FIG. 3a illustrates a first portion of a Central Processing Unit.
Figure 3B:
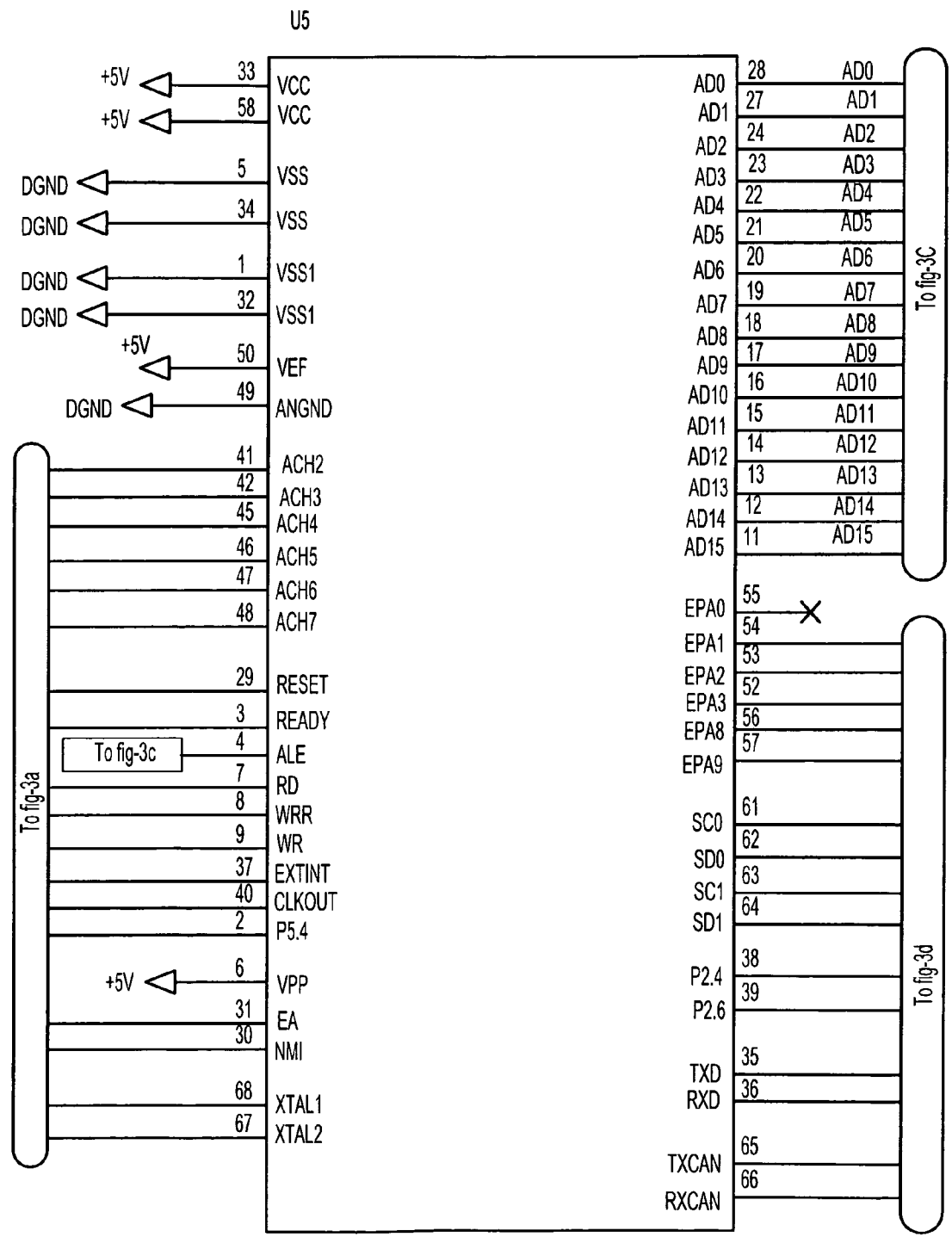
FIG. 3b illustrates a second portion of a Central Processing Unit.
Figure 3C:
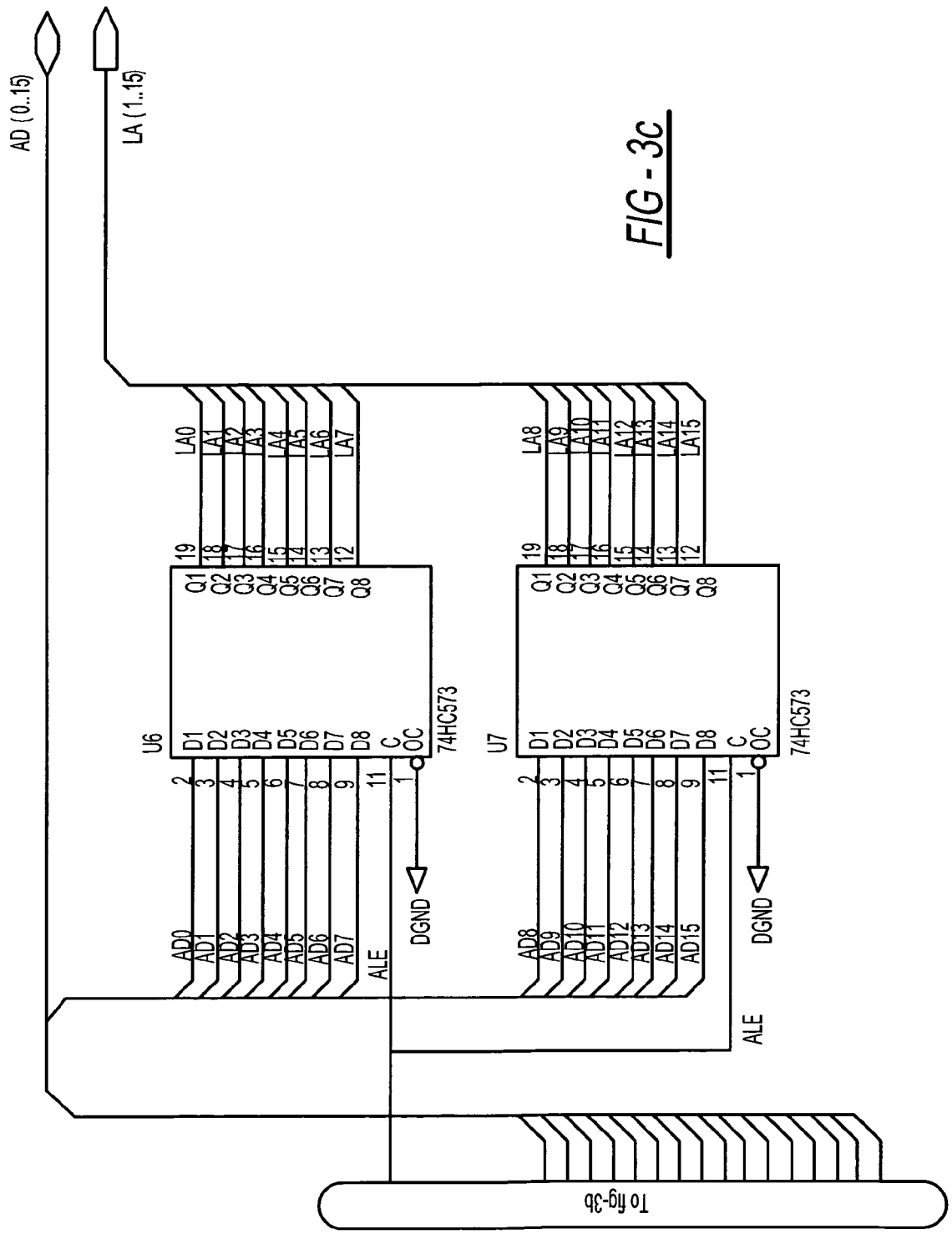
FIG. 3c illustrates a third portion of a Central Processing Unit.
Figure 3D:
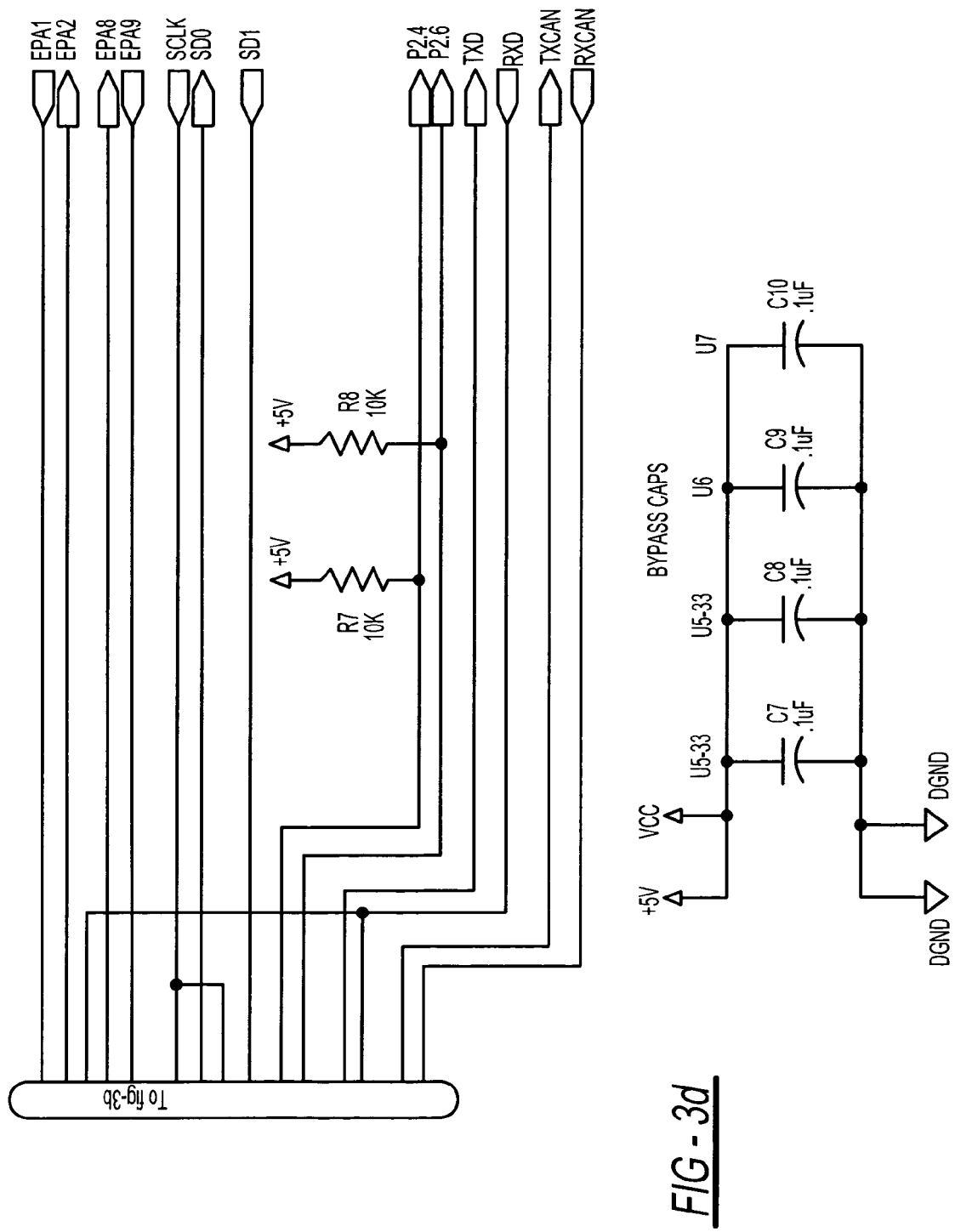
FIG. 3d illustrates a fourth portion of a Central Processing Unit.
Figure 4:
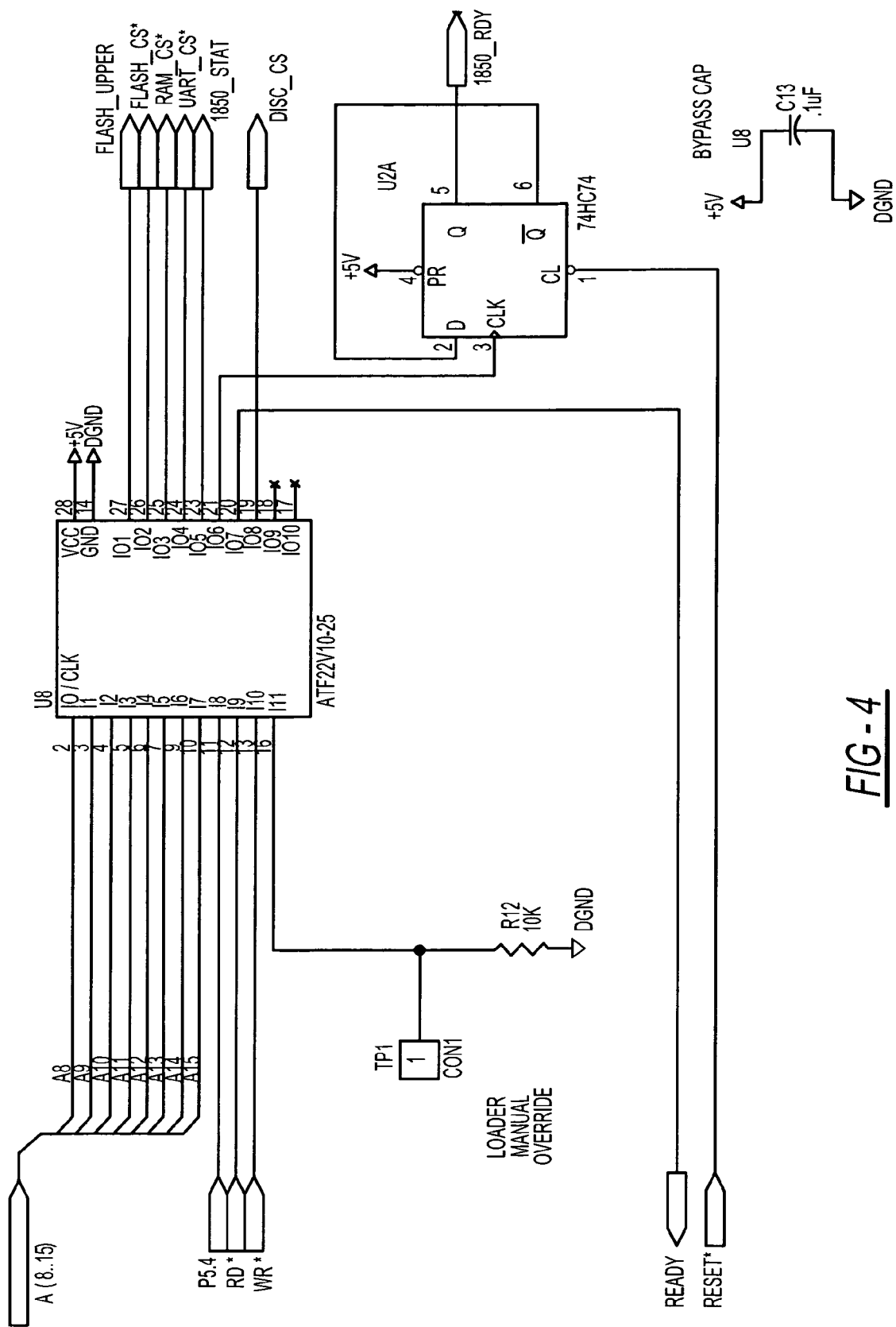
FIG. 4 illustrates Device Decoder.
Figure 5:
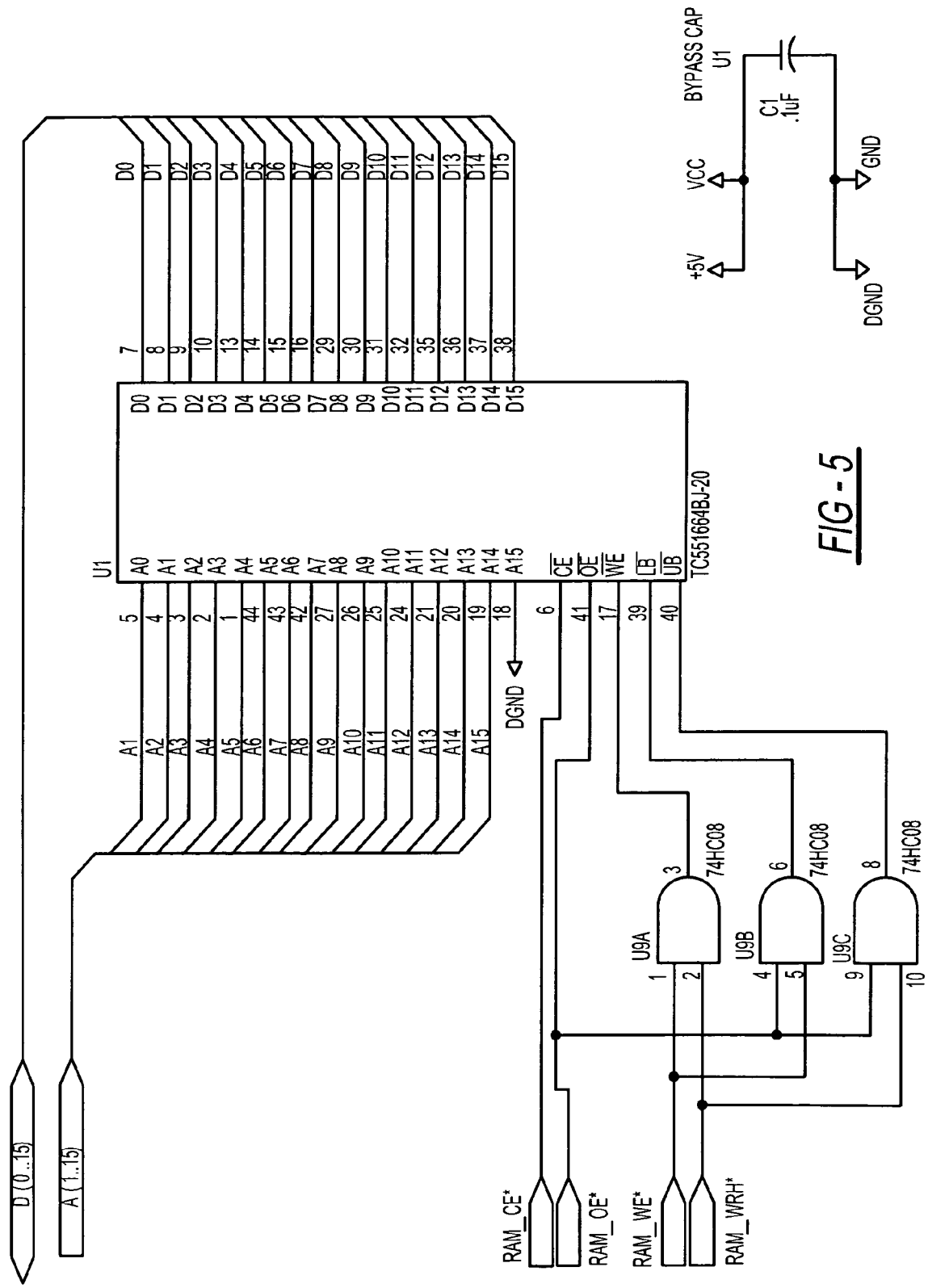
FIG. 5 illustrates static RAM Module.
Figure 6:
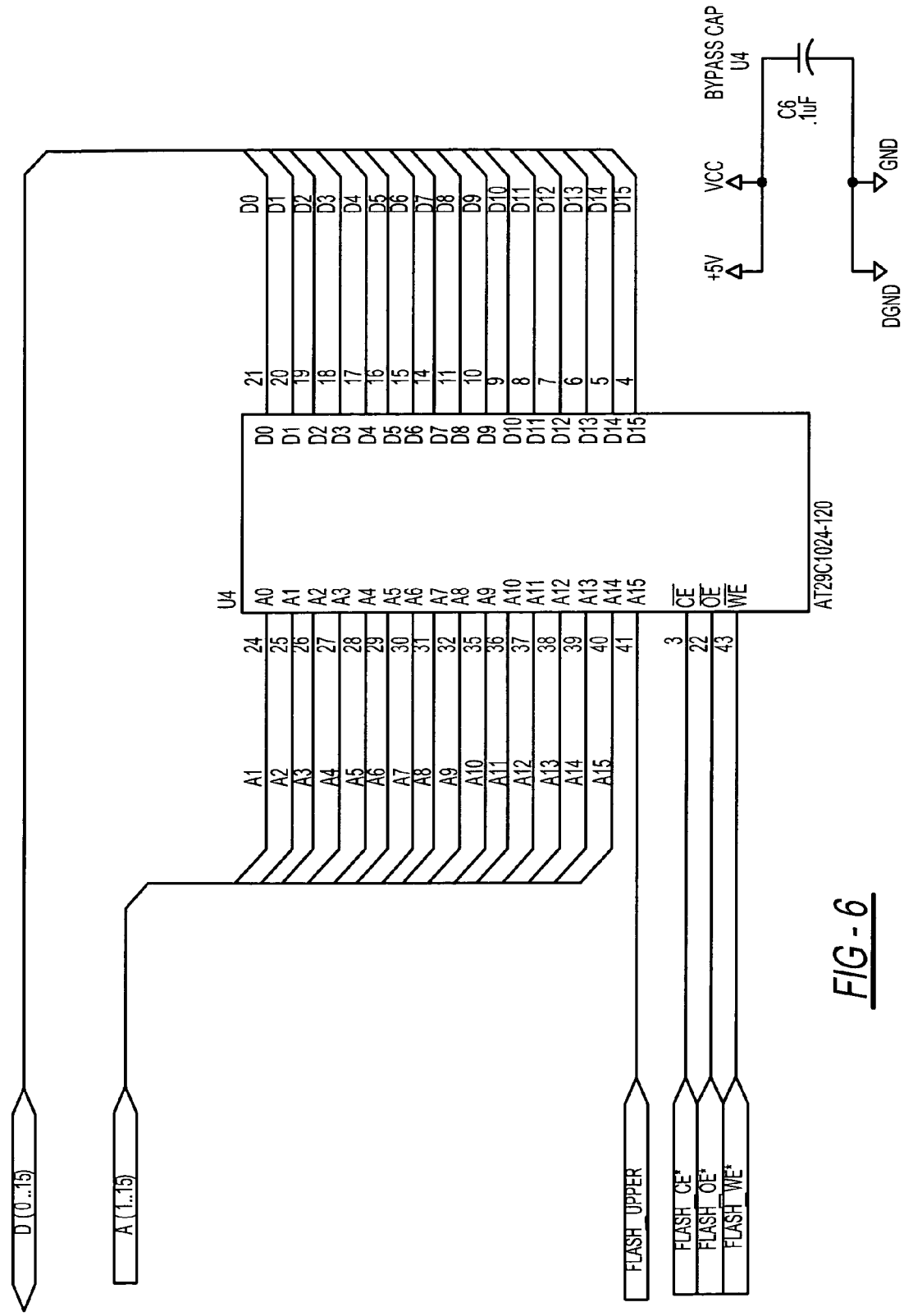
FIG. 6 illustrates Flash Memory Module.
Figure 7:
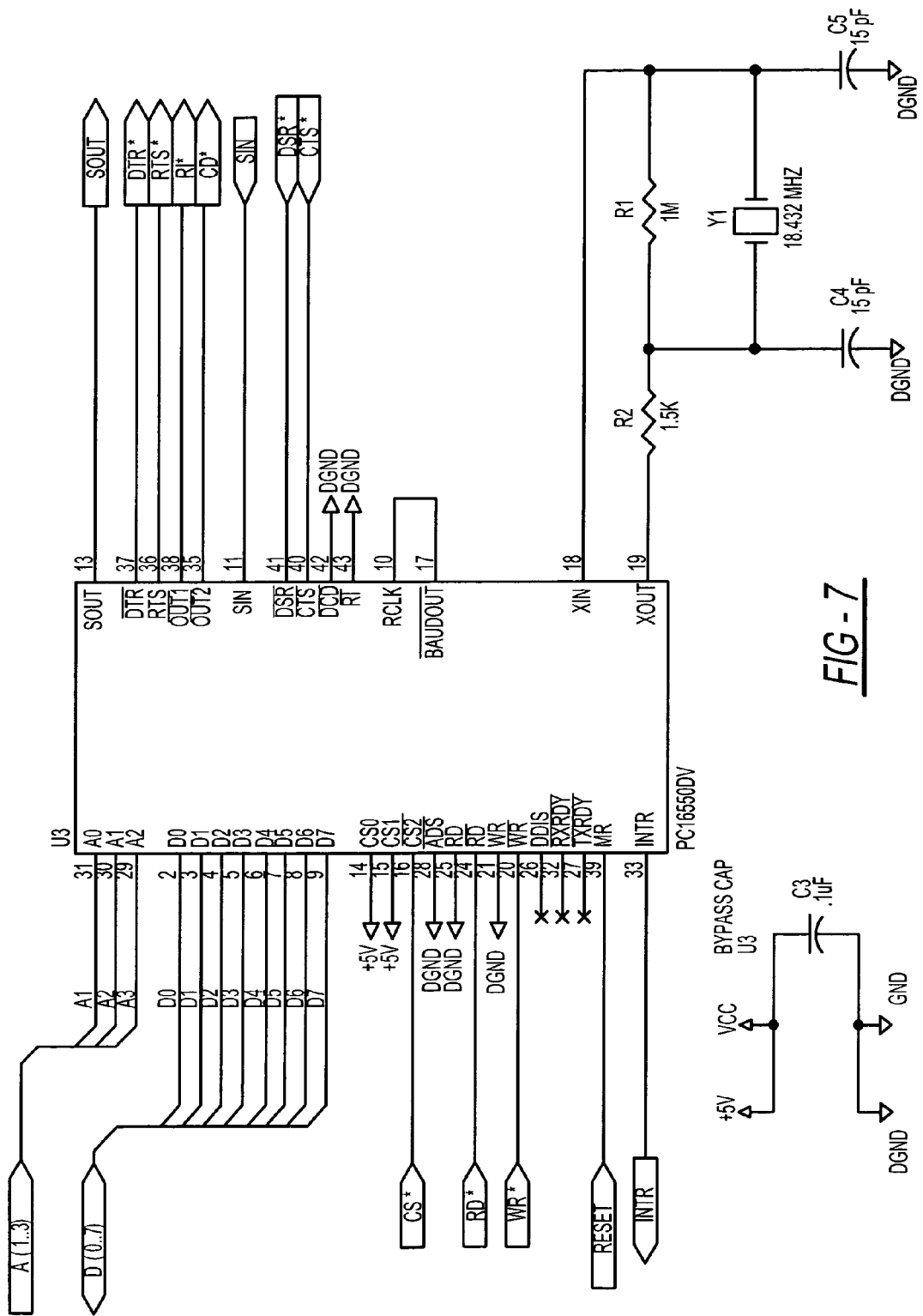
FIG. 7 illustrates UART.
Figure 8B:
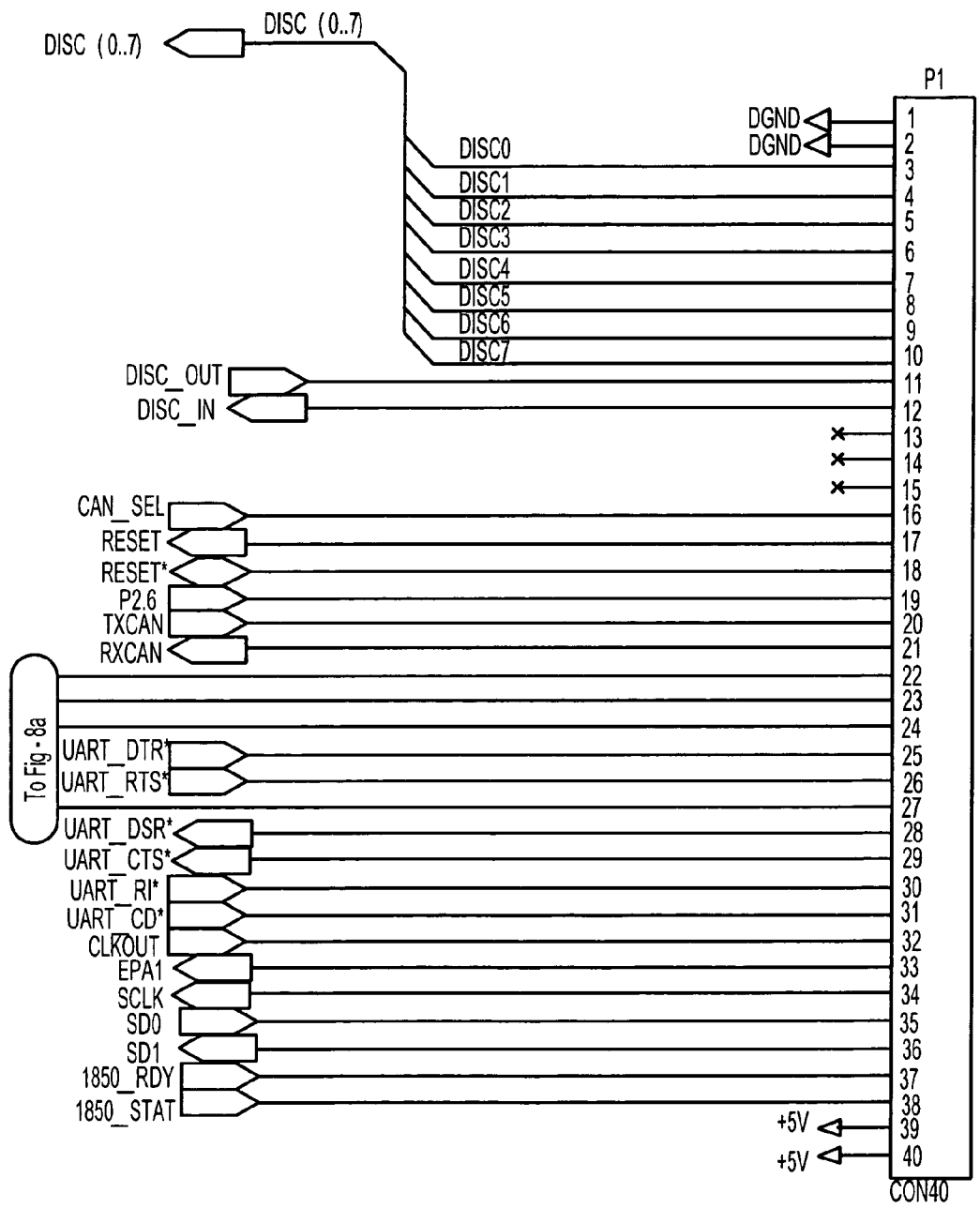
FIG. 8b illustrates a second portion of CPU/I/O Interface Connectors.
Figure 9:
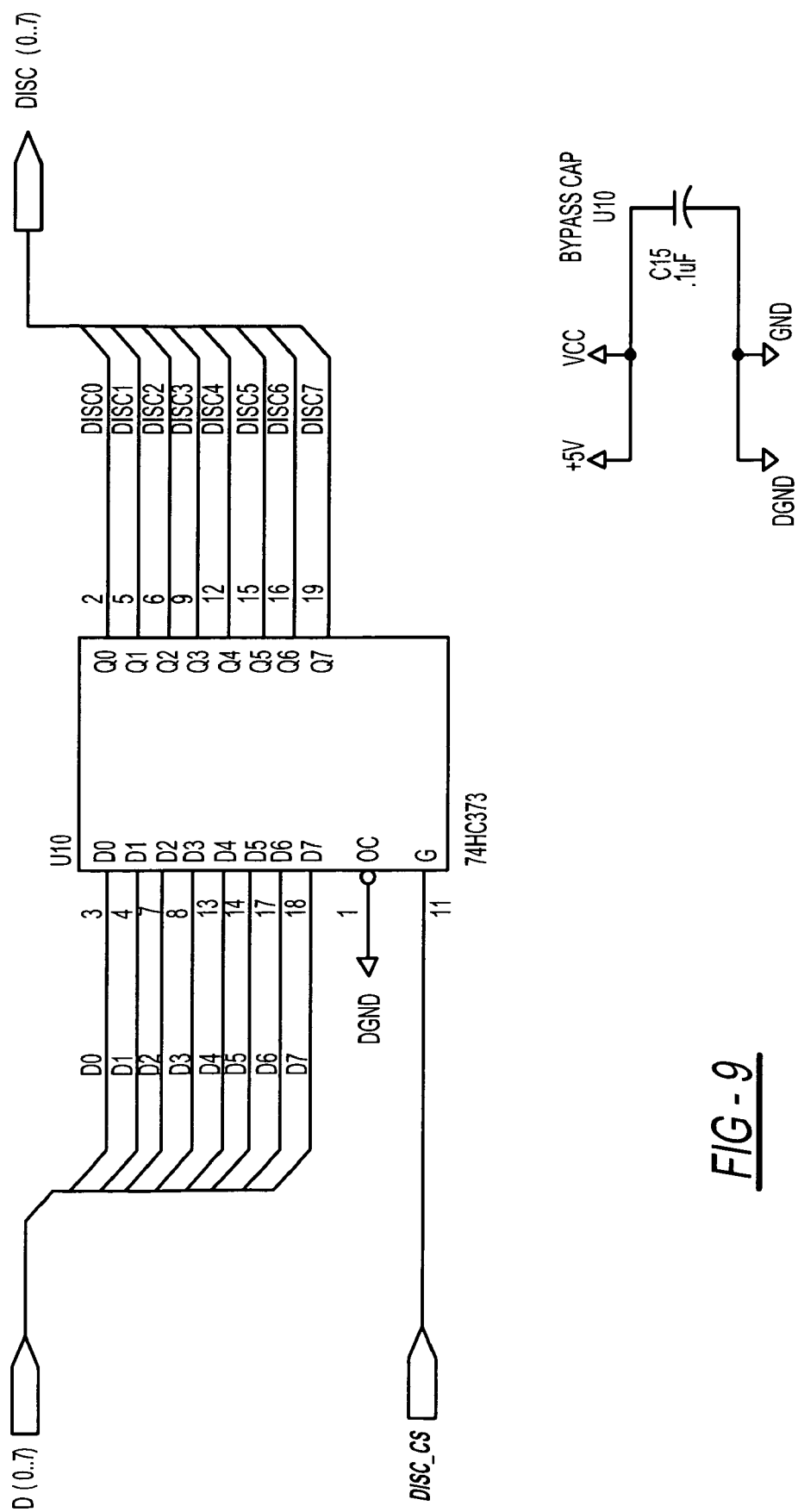
FIG. 9 illustrates Discrete Output Latch.
Figure 11A:
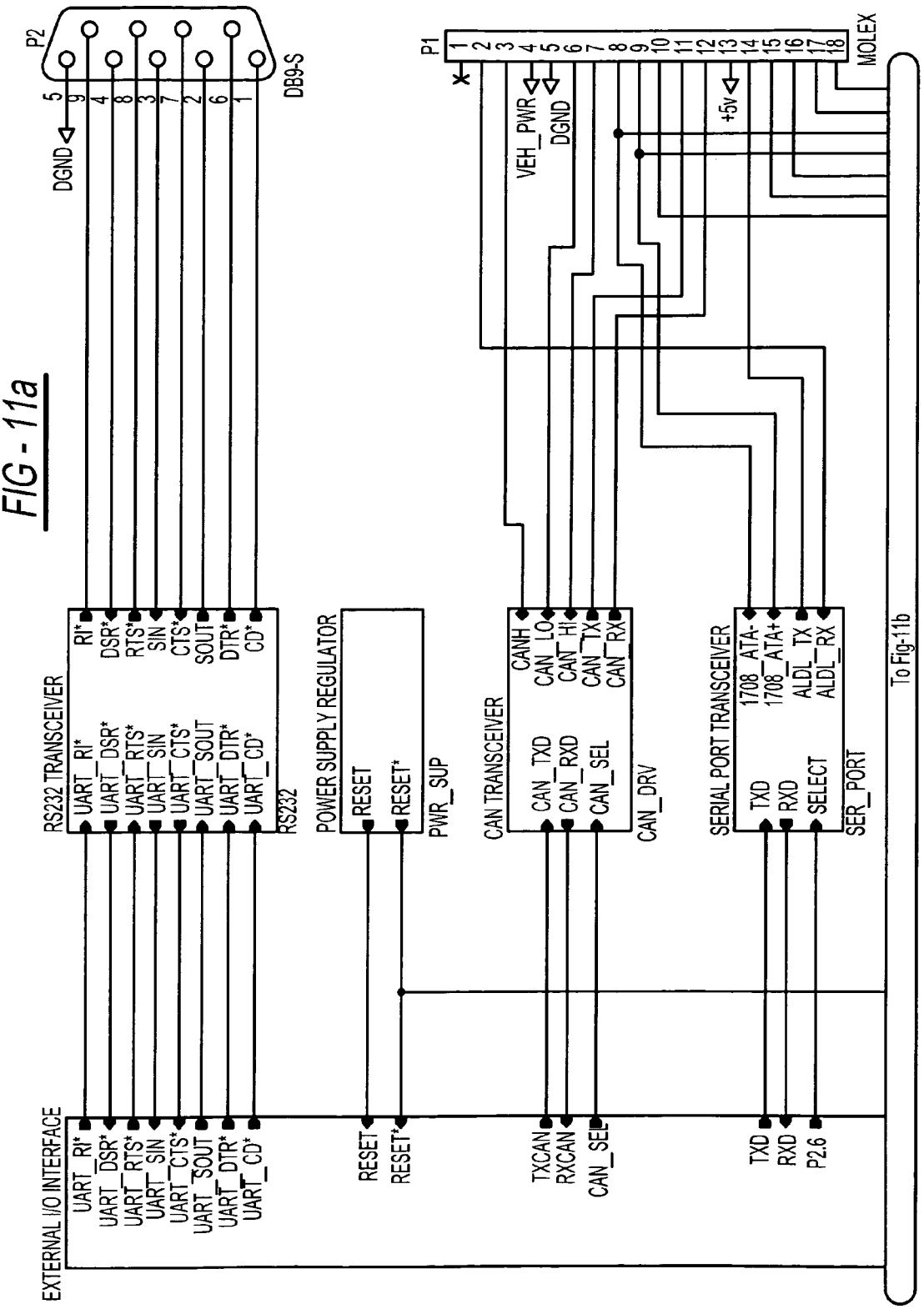
FIG. 11a illustrates a first portion of a DPA I/O Board.
Figure 11B:
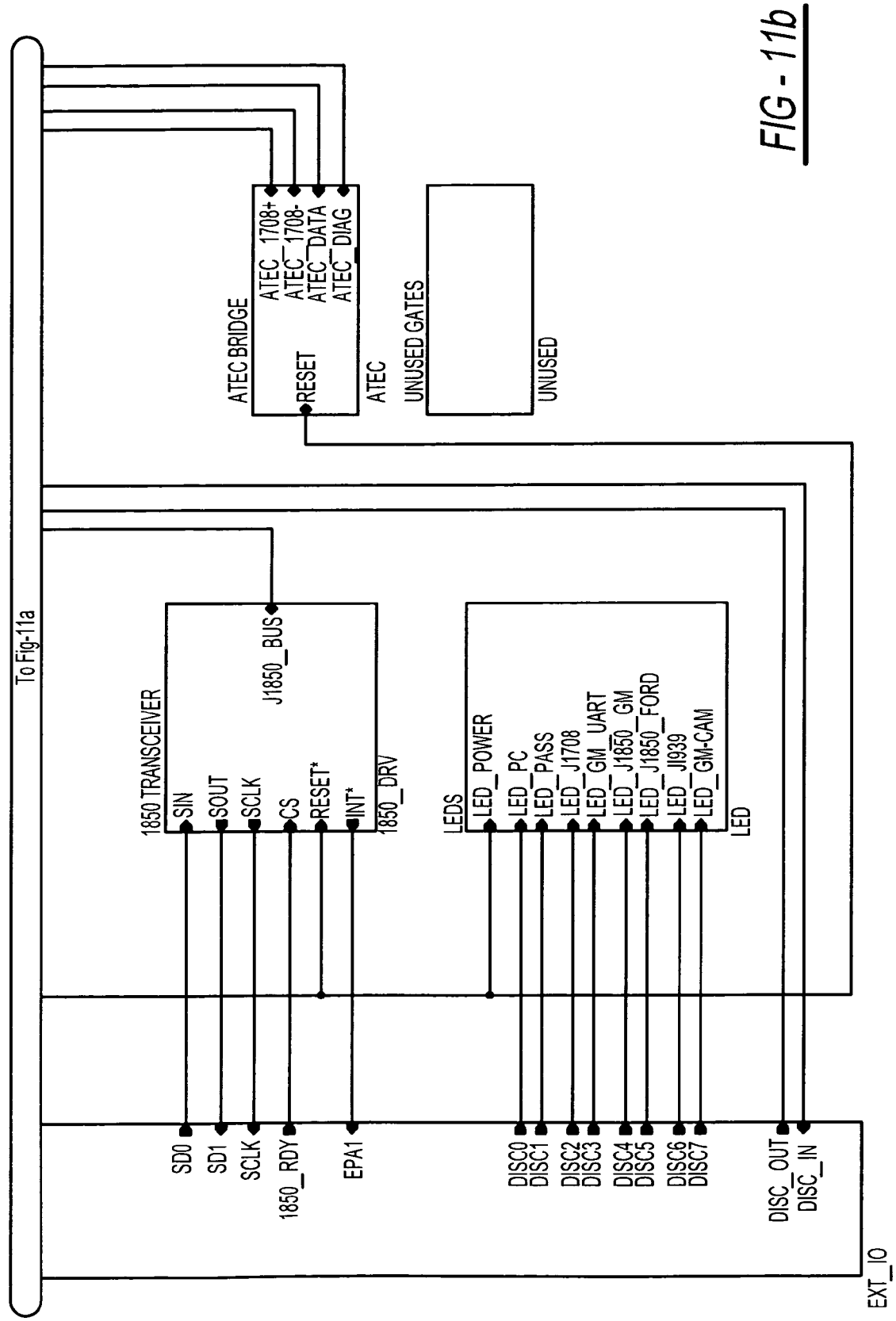
FIG. 11b illustrates a second portion of a DPA I/O Board.
Figure 12:
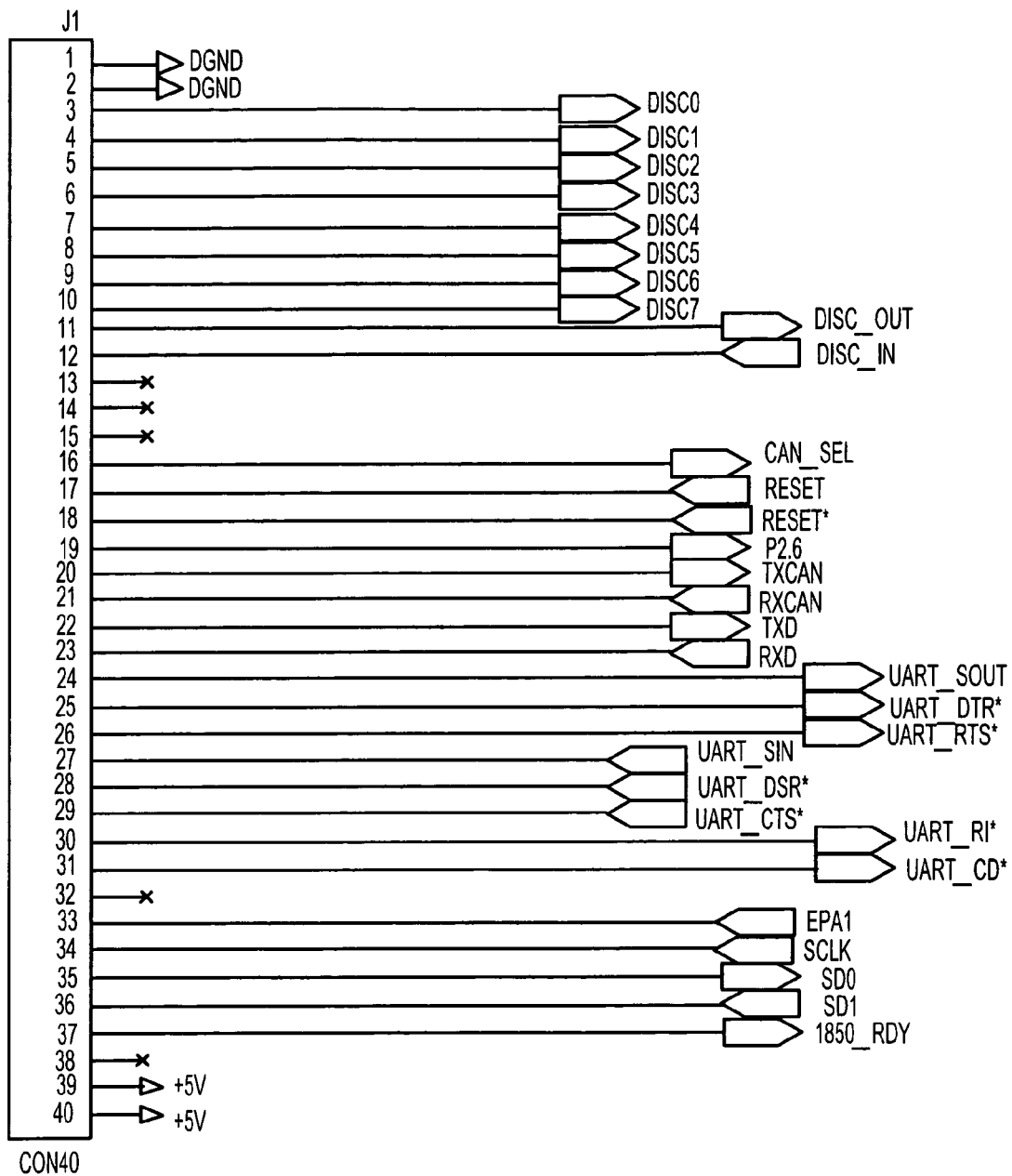
FIG. 12 illustrates I/O Interface Connector.
Figure 13:
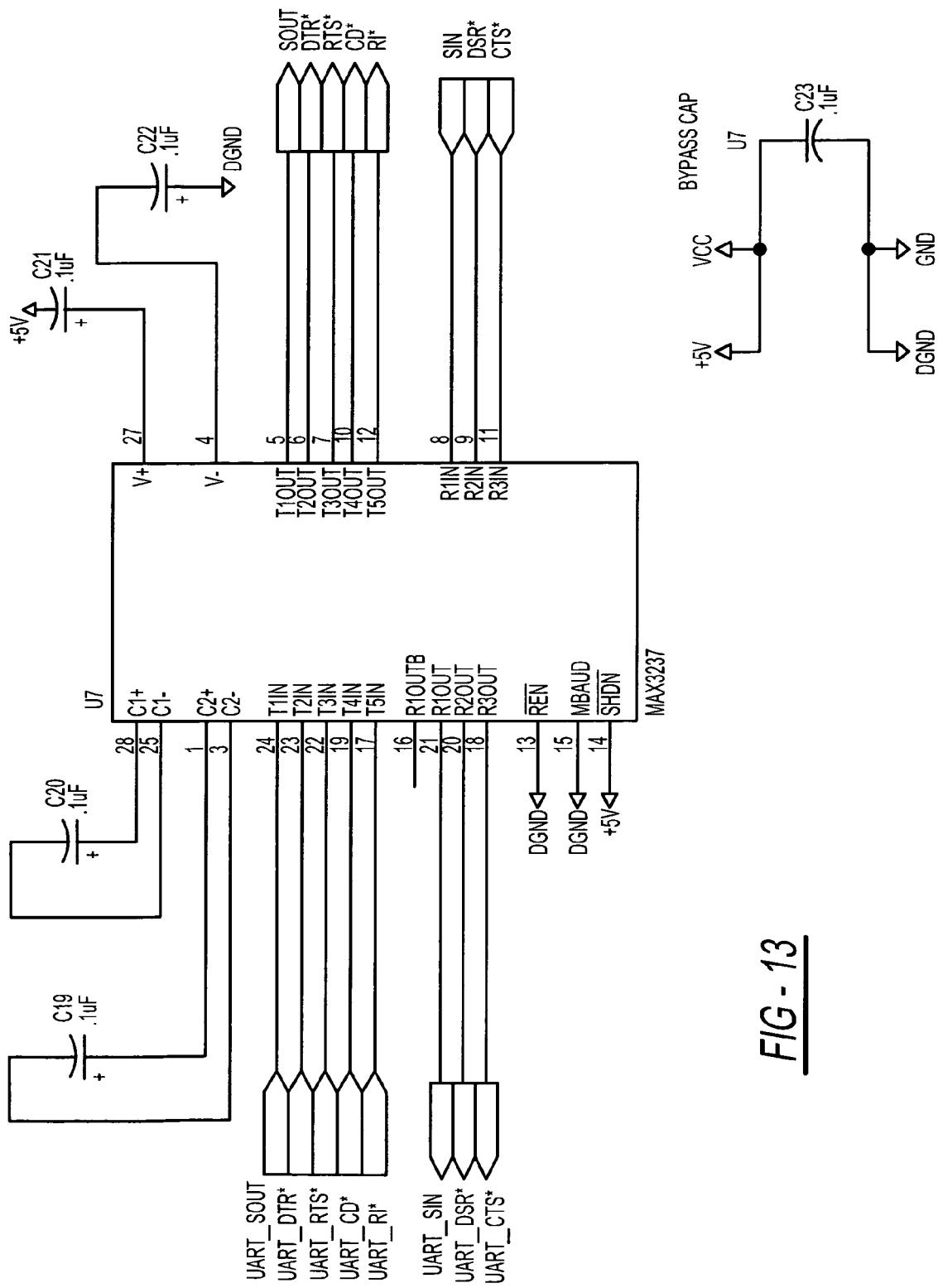
FIG. 13 illustrates RS-232 Transceivers.
Figure 14:
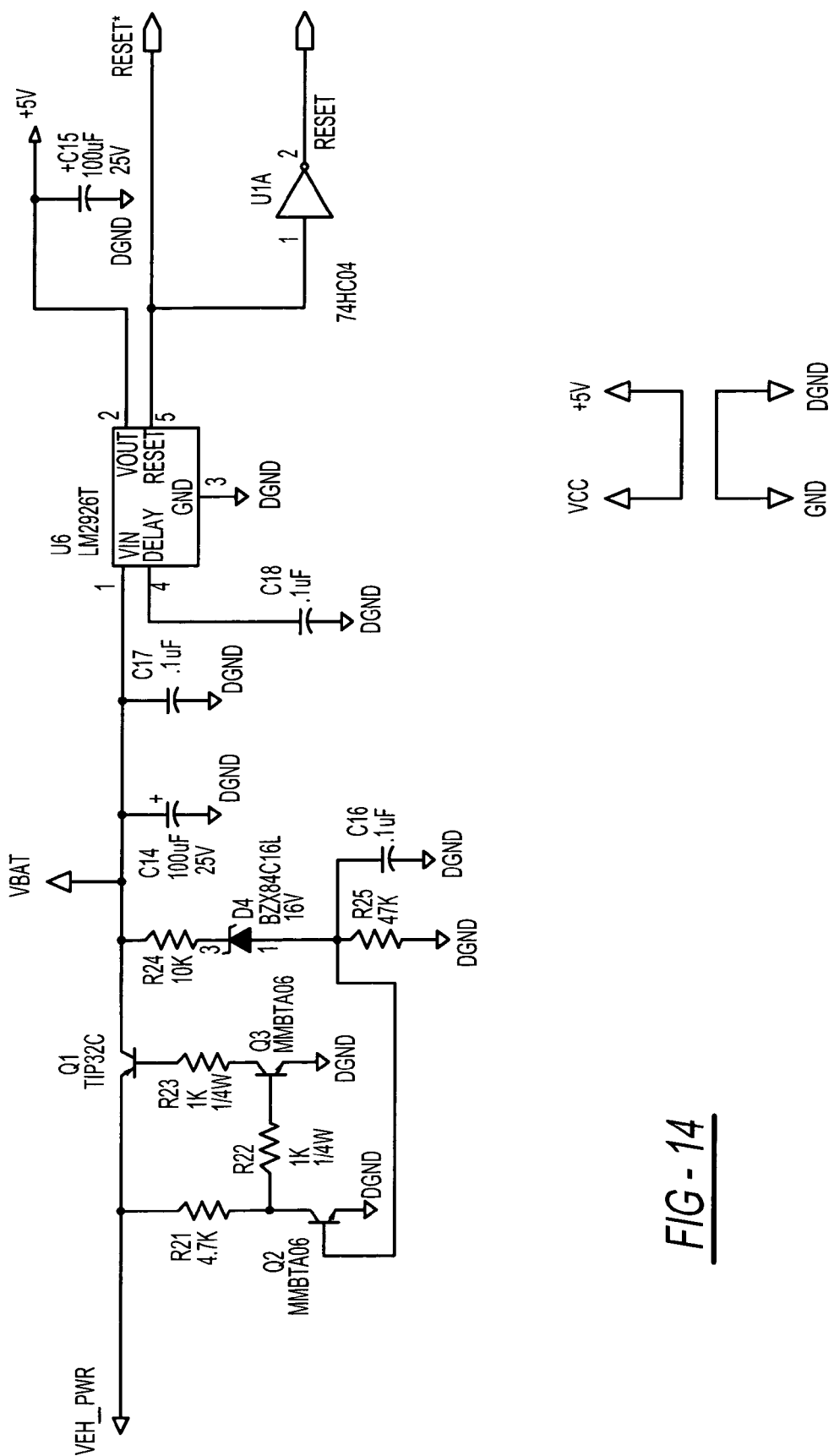
FIG. 14 illustrates Power Supply Regulator.
Figure 15:
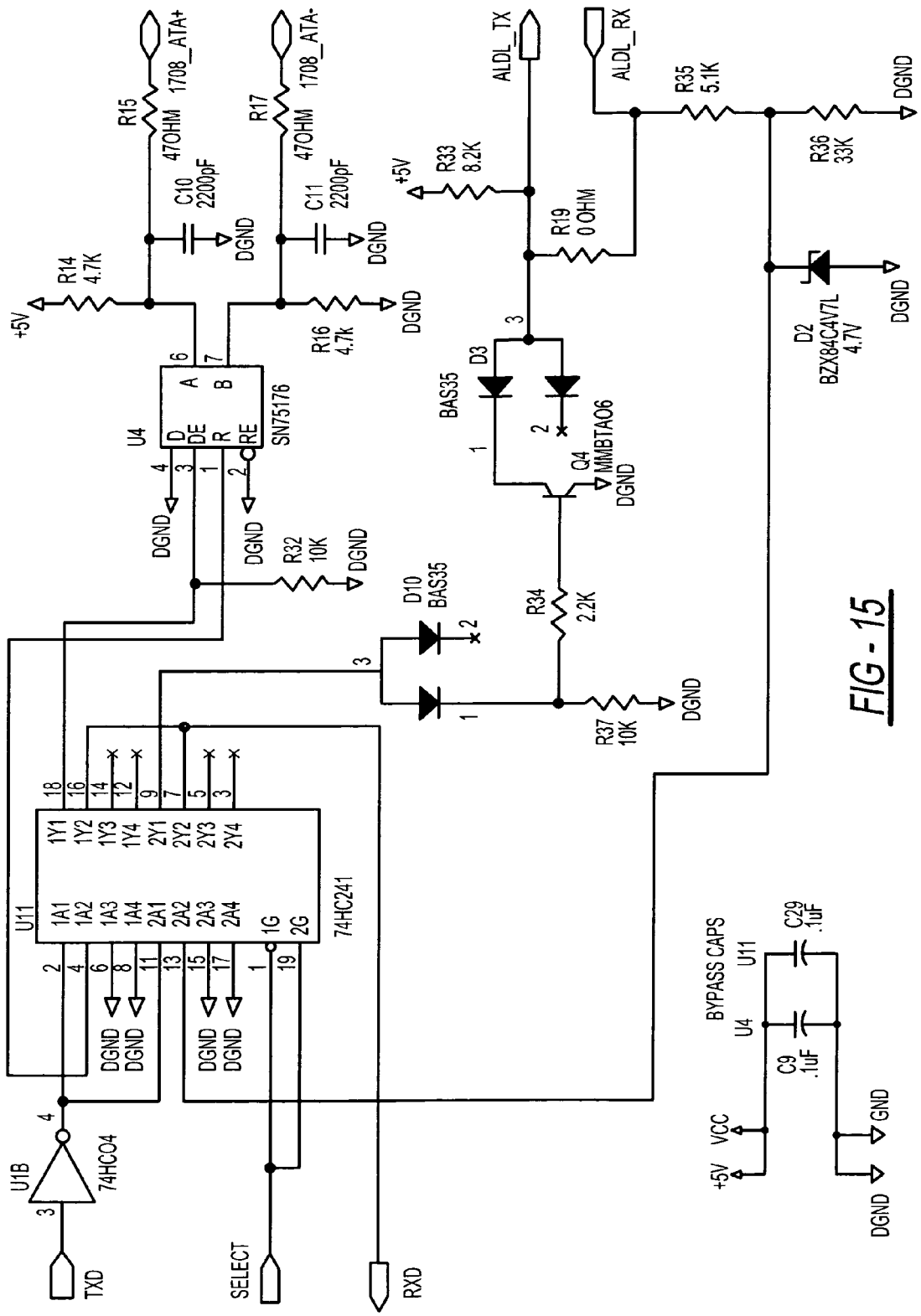
FIG. 15 illustrates 1708 Transceiver.
Figure 16:
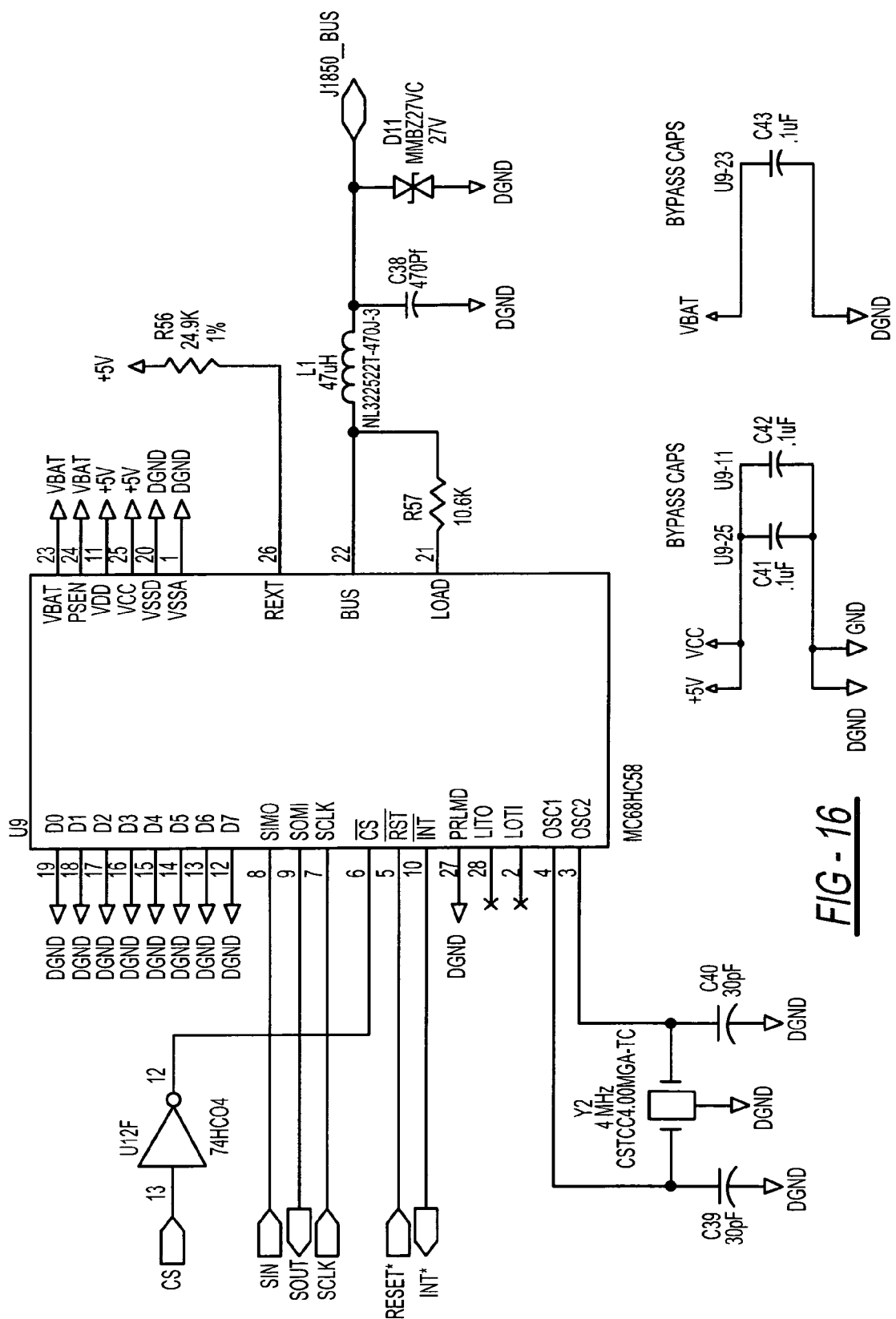
FIG. 16 illustrates J1850 Transceiver.
Figure 17:
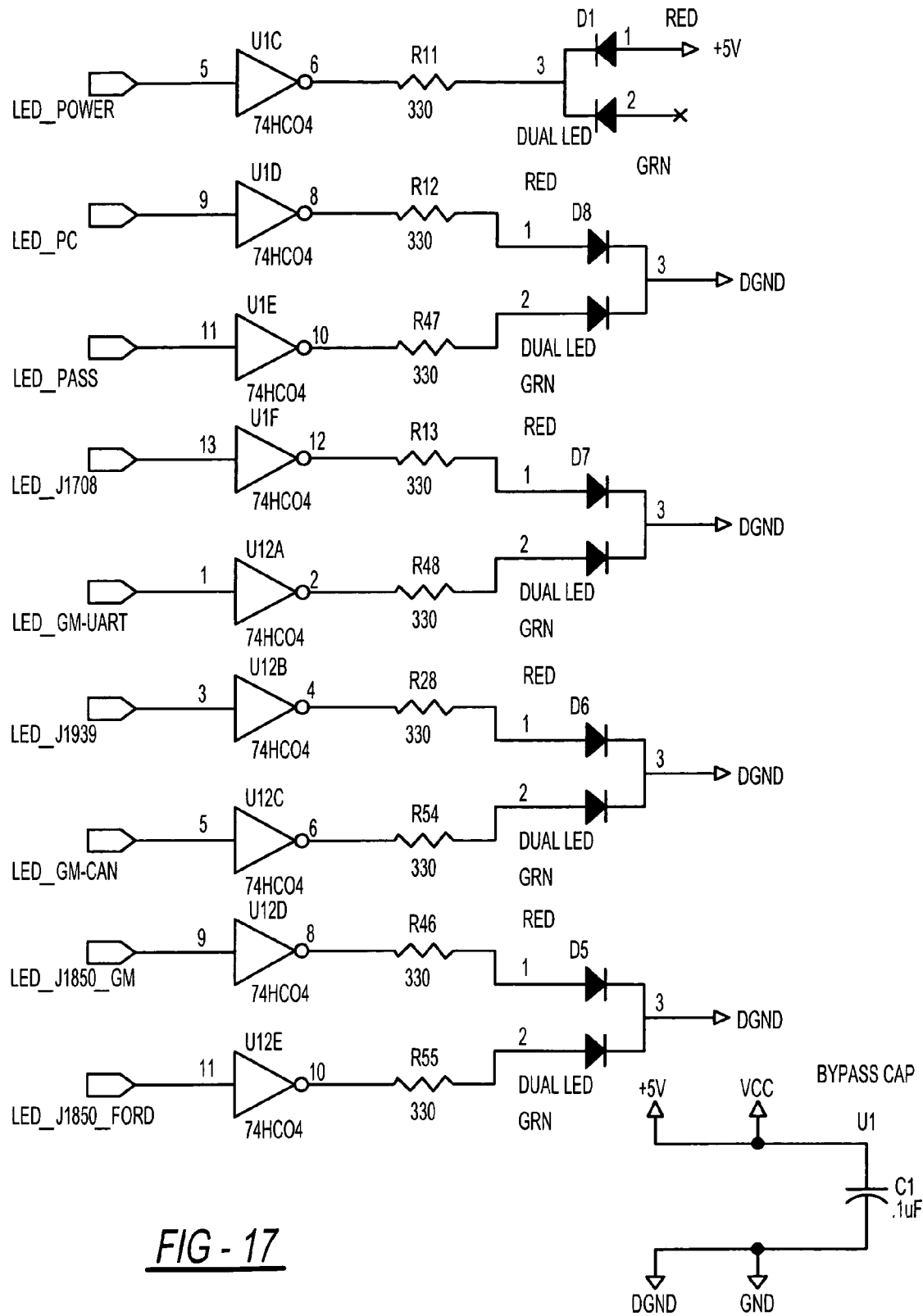
FIG. 17 illustrates LED Indicators.
Figure 18:
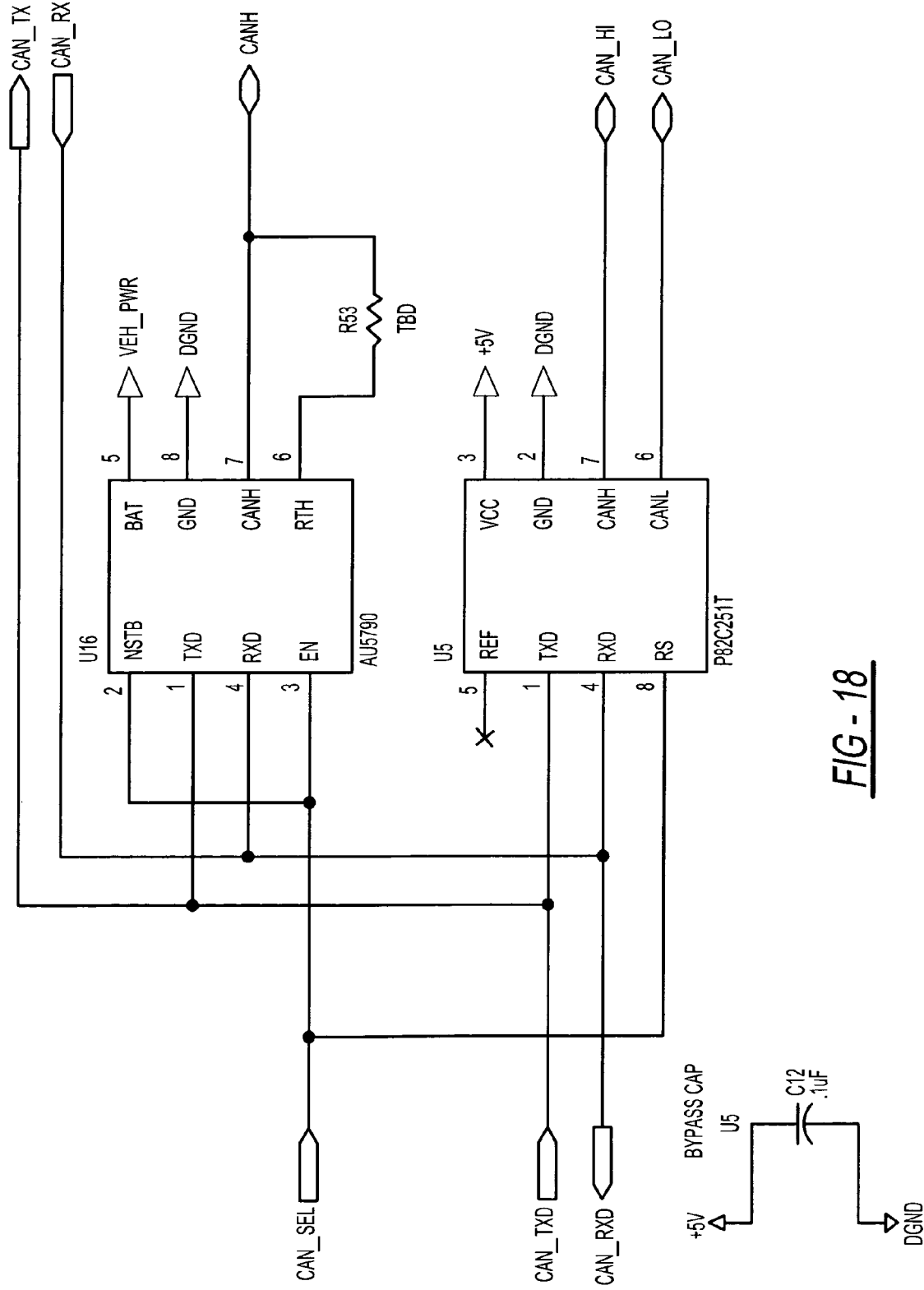
FIG. 18 illustrates CAN Transceiver.
Figure 19A:
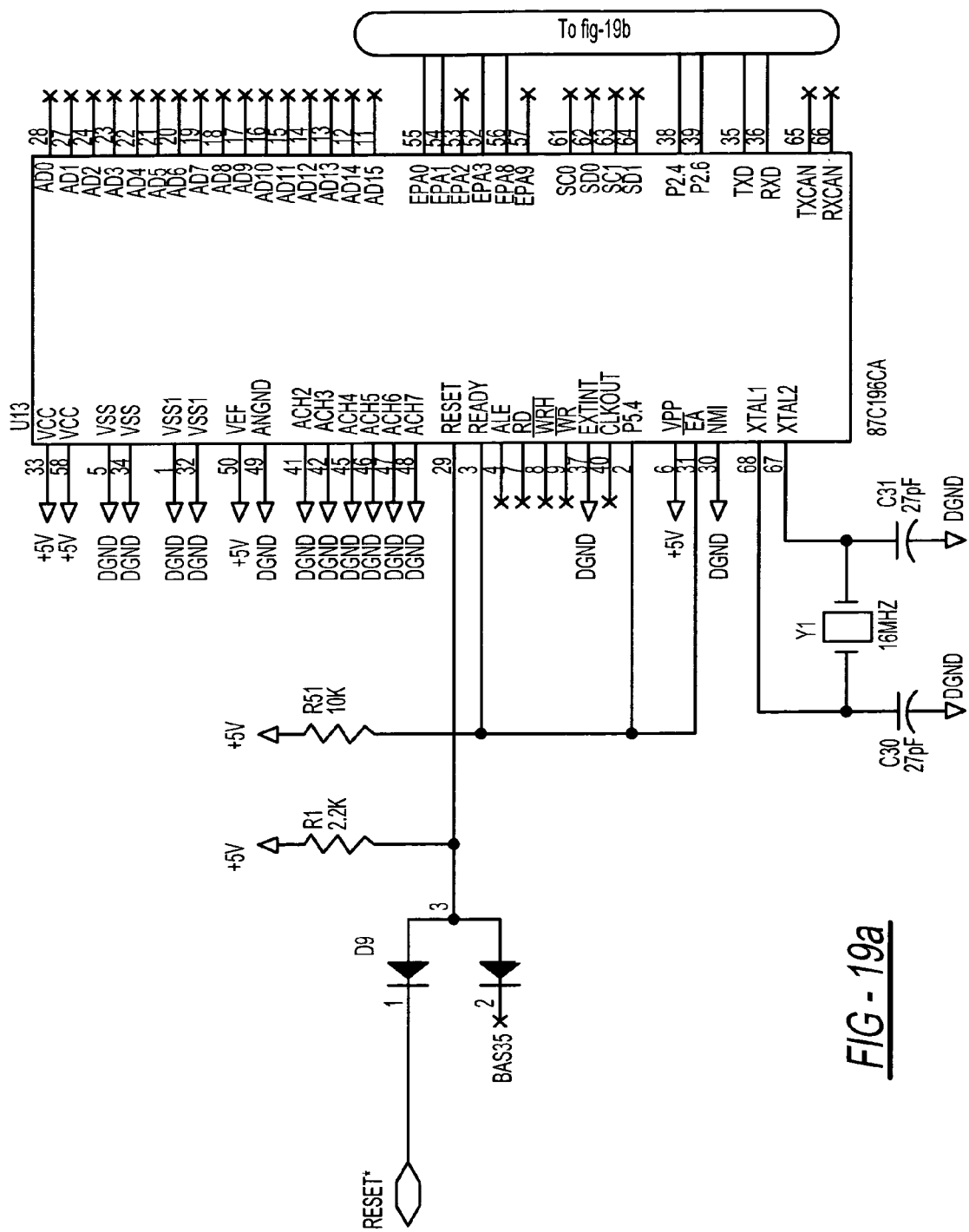
FIG. 19a illustrates a first portion of an ATEC to J1708 Bridge.
Figure 19B:
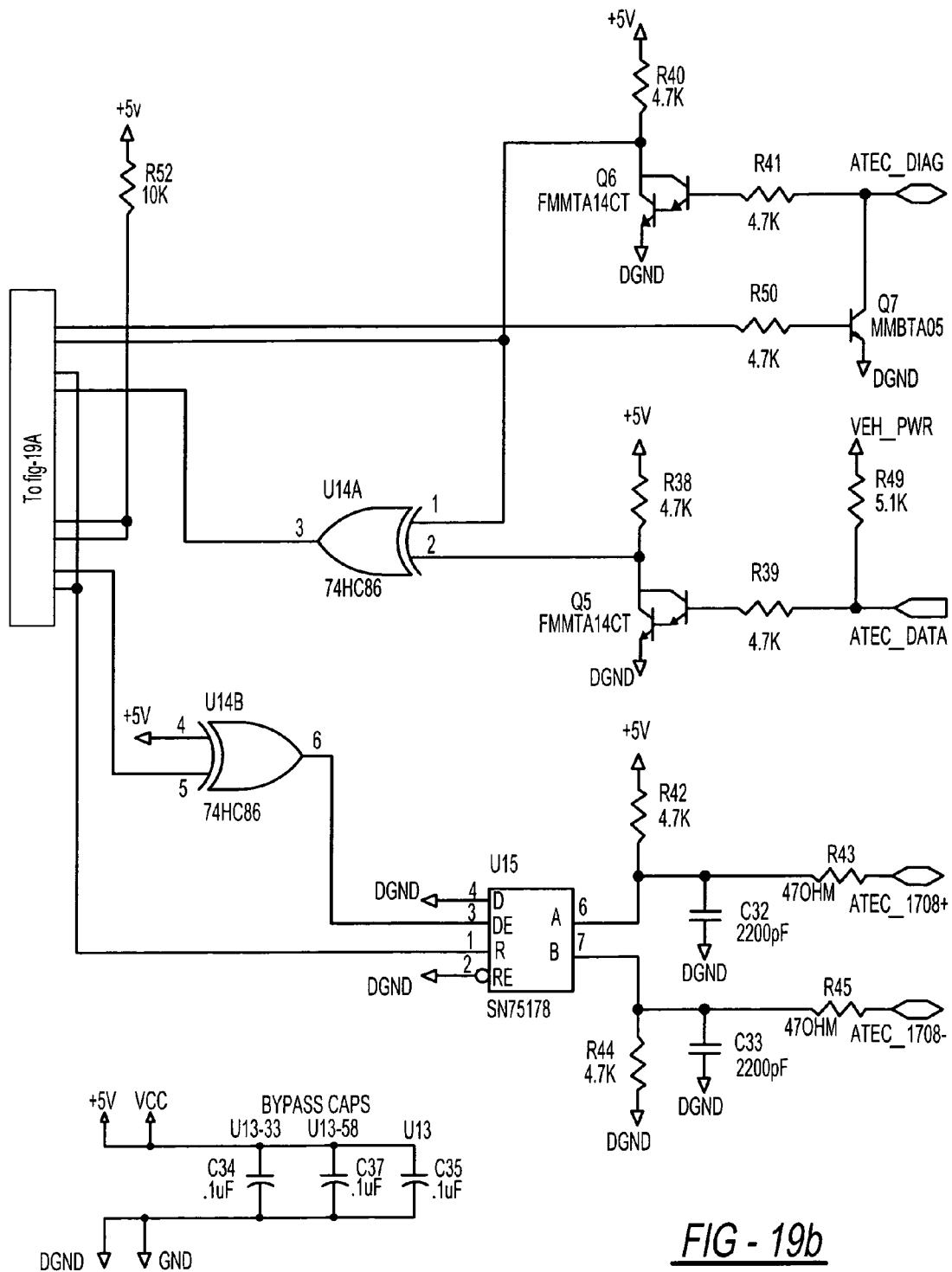
FIG. 19b illustrates a second portion an ATEC to J1708 Bridge.

Now turning to the drawings, the circuits of the protocol adapter are thereshown in FIGS. 1 through 20.

The pass through/smart mode is U11 (shown on FIG. 8) and is controlled by U5 (shown on FIG. 3) to determine if the host PC is listening to the J1708 link, or if the host PC is wanting to have a slave session with the DPA (diagnostic tool).

The U5 micro (FIG. 3) at power up will flash LEDs 2, 3, 4, and 5 (FIG. 26) to allow the operator to know what version of software is running inside the protocol adapter or diagnostic tool (DPA).

Now turning to FIGS. 21 through 25, the LED descriptions are thereshown with the LED diagram shown in FIG. 26.

The invention claimed is:

1. A system for providing data communications between a motor vehicle electronic control module network and an RS-232 serial ASCII-text capable device, said motor vehicle electronic control module network using one or more of a plurality of different protocols, the system comprising:

a microprocessor-based hardware having vehicle communications network bus circuitry for interfacing with said motor vehicle electronic control module network, said microprocessor-based hardware also having at least one port, at least connector used with said at least one port for connecting said microprocessor-based hardware with said RS-232 serial ASCII-text capable device, and programmed with software to translate communications between the vehicle communications network bus circuitry and at the at least one port, the system connected to an RS-232 serial ASCII-text capable device, said RS-232 serial ASCII-text capable device capable of transmitting ASCII-text to said microprocessor-based hardware and receiving ASCII-text from said microprocessor-based hardware;

wherein said microprocessor-based hardware is operable to monitor and translate messages between said plurality of protocols at the same time.

2. The system according to claim 1, wherein the vehicle electronic control module network uses a CAN (Controller Area Network) protocol with 11-bit identifier.

3. The system according to claim 1, wherein the vehicle electronic control module network uses a CAN (Controller Area Network) protocol with 29-bit identifier.

4. The system according to claim 1, wherein the vehicle electronic control module network uses an SAE (Society of Automotive Engineers) J1939 protocol implementation of CAN.

5. The system according to claim 1, wherein the vehicle electronic control module network uses an SAE J1850 protocol.

6. The system according to claim 1, wherein the vehicle electronic control module network uses an SAE J1708 protocol.

7. The system according to claim 1, wherein the vehicle electronic control module network uses a GM (General Motors Corporation) UART (Universal Asynchronous Receiver/Transmitter) network.

8. The system according to claim 1, employing one of CAN (Controller Area Network) with 11-bit identifier, CAN (Controller Area Network) with 29-bit identifier, SAE (Society of Automotive Engineers) J1939 implementation of CAN, SAE J1850, SAE J1708, and GM (General Motors Corporation) UART (Universal Asynchronous Receiver/Transmitter) network, wherein the RS-232 serial ASCII-text capable device transmitting ASCII-text to and receiving ASCII-text from the system is a programmable logic controller (PLC).

9. The system according to claim 1, employing one of CAN (Controller Area Network) with 11-bit identifier, CAN (Controller Area Network) with 29-bit identifier, SAE (Society of Automotive Engineers) J1939 implementation of CAN, SAE J1850, SAE J1708, and GM (General Motors Corporation) UART (Universal Asynchronous Receiver/Transmitter) network, wherein the RS-232 serial ASCII-text capable device transmitting ASCII-text to and receiving ASCII-text from the system is a microcomputer.

10. The system according to claim 1, employing one of CAN (Controller Area Network) with 11-bit identifier, CAN (Controller Area Network) with 29-bit identifier, SAE (Society of Automotive Engineers) J1939 implementation of CAN, SAE J1850, SAE J1708, and GM (General Motors Corporation) UART (Universal Asynchronous Receiver/Transmitter) network, wherein the RS-232 serial ASCII-text capable device transmitting ASCII-text to and receiving ASCII-text from the system is a handheld computer.

11. The system according to claim 1, employing one of CAN (Controller Area Network) with 11-bit identifier, CAN (Controller Area Network) with 29-bit identifier, SAE (Society of Automotive Engineers) J1939 implementation of CAN, SAE J1850, SAE J1708, and GM (General Motors Corporation) UART (Universal Asynchronous Receiver/Transmitter) network, wherein the RS-232 serial ASCII-text capable device transmitting ASCII-text to and receiving ASCII-text from the system is a device having sufficient hardware circuitry and software embedded therein to perform needed operation.

12. The system according to claim 1, wherein the one or more of a plurality of commands is selected from the group consisting of ECU fault code interrogation, communication with a remote vehicle network, vehicle maintenance status checks, trip performance, data downloads, asset control, logistics, inventory management, diagnostic support, maintenance/scheduling, and combinations thereof.

13. The system according to claim 1, said one or more of a plurality of commands further comprising parameters accessed for control over system components selected from the group consisting of engine, transmission, brakes, instrument clusters, and combinations thereof.

14. A system for providing data communications between a motor vehicle electronic control module network and an RS-232 serial ASCII-text capable device, said motor vehicle electronic control module network using one or more of a plurality of different protocols, the system comprising:

a microprocessor-based hardware having vehicle communications network bus circuitry for interfacing with said motor vehicle electronic control module network, said microprocessor-based hardware also having at least one port, at least one connector used with said at least one port for connecting said microprocessor-based hardware with said RS-232 serial ASCII-text capable device, and programmed with software to translate communications between the vehicle communications network bus circuitry and the at least one port, the system connected to an RS-232 serial ASCII-text capable device, said RS-232 serial ASCII-text capable device capable of transmitting ASCII-text to said microprocessor-based hardware and receiving ASCII-text from said microprocessor-based hardware; and universal asynchronous transmit and receive (UART) circuitry operable as part of said microprocessor-based hardware for providing universal asynchronous communication between said microprocessor-based hardware and said ASCII-text capable device, and between said microprocessor-based hardware and said motor vehicle electronic control network;

wherein said microprocessor-based hardware is operable to monitor and translate messages between said plurality of protocols at the same time.

15. The system according to claim 14, wherein the ASCII-text capable device is selected from the group consisting of a programmable logic controller, a microcomputer and a personal digital assistant.

16. The system according to claim 14, wherein the plurality of protocols are selected from the group consisting of SAE J1850 GM class 2 protocol, SAE J1850 Chrysler protocol, GM class 1 UART protocol, ISO 9141-2 protocol, ISO 9141-1989 protocol, ISO 9141-special protocol, SAE J2284 dual-wire CAN protocol and SAE J2411 single wire CAN protocol.

17. The system according to claim 14, further comprising a plurality of LEDs for indicating which protocol the system is converting including a pass-through mode.

18. The system according to claim 17, wherein the plurality of LEDs include at least one dual colored LEDs.

19. The system according to claim 14, wherein the one or more of a plurality of commands is selected from the group consisting of: ECU fault code interrogation; communication with a remote vehicle network; vehicle maintenance status checks; trip performance; data downloads; asset control; logistics; inventory management; diagnostic support; maintenance/scheduling; and combinations thereof.

20. The system according to claim 14, said one or more of a plurality of commands further comprising parameters accessed for control over system components selected from the group consisting of engine, transmission, brakes, instrument clusters, and combinations thereof.

21. The system according to claim 19, further comprising a plurality of LEDs for indicating which protocol the system is converting including a pass-through mode.

22. The system according to claim 19, wherein the one or more of a plurality of commands is selected from the group consisting of: ECU fault code interrogation; communication with a remote vehicle network; vehicle maintenance status checks; trip performance; data downloads; asset control; logistics; inventory management; diagnostic support; maintenance/scheduling; and combinations thereof.

23. The system according to claim 19, said one or more of a plurality of commands further comprising parameters accessed for control over system components selected from the group consisting of engine, transmission, brakes, instrument clusters, and combinations thereof.

24. A system for converting signals transmitted between a vehicle network and an ASCII-text external device, said vehicle network using one or more of a plurality of different protocols, said system comprising:

an RS-232 port for coupling the ASCII-text external device to the system; and circuitry responsive to signals from the vehicle network and signals from the ASCII-text external device, said circuitry converting ASCII-text signals from the ASCII-text external device to any one of the plurality of protocols that the vehicle network module may be using, and converting signals in any of the protocols from the vehicle network to ASCII-text such that said ASCII-text external device is operable to send one or more of a plurality of commands to the vehicle network and said circuitry provides communication between said ASCII-text external device and said vehicle network in more than one of said plurality of protocols, said microprocessor-based hardware being operable to monitor and translate messages between said plurality of protocols at the same time, said circuitry further including a voltage translator for voltage translating signals transmitted between the vehicle network and the ASCII-text external device.

25. The system according to claim 24, wherein the ASCII-text external device is selected from the group consisting of a programmable logic controller, a microcomputer, and a personal digital assistant.

26. The system according to claim 24, wherein the plurality of protocols are selected from the group consisting of SAE J1850 GM class 2 protocol, SAE J1850 Chrysler protocol, GM class 1 UART protocol, ISO 9141-2 protocol, ISO 9141-1989 protocol, ISO 9141-special protocol, SAE J2284 dual-wire CAN protocol and SAE J2411 single wire CAN protocol.

* * * * *

UNITED STATES PATENT AND TRADEMARK OFFICE
CERTIFICATE OF CORRECTION

| | | |
|---|---|---|
| PATENT NO. | : 7,984,225 B2 | |
| APPLICATION NO. | : 12/653637 | |
| DATED | : July 19, 2011 | |
| INVENTOR(S) | : Robert E. McClure et al. | |

It is certified that error appears in the above-identified patent and that said Letters Patent is hereby corrected as shown below:

Column 1,
Line 38, "truck buses" should be -- trucks & buses --.

Column 3,
Line 22, "DDPB" should be -- DPB --.

Column 3,
Line 45, "reproming" should be -- reprogramming --.

Signed and Sealed this
Twenty-fifth Day of October, 2011

David J. Kappos
*Director of the United States Patent and Trademark Office*